July 5, 1966  W. H. PETERSON  3,259,252
ADJUSTABLE CUSHIONING ARRANGEMENT FOR RAILROAD CARS
Original Filed Jan. 21, 1963  13 Sheets-Sheet 1

Inventor
William H. Peterson
By Richard J. Myers
Attys.

Inventor
William H. Peterson
By Richard J. Myers
Attys

July 5, 1966 W. H. PETERSON 3,259,252
ADJUSTABLE CUSHIONING ARRANGEMENT FOR RAILROAD CARS
Original Filed Jan. 21, 1963 13 Sheets-Sheet 3
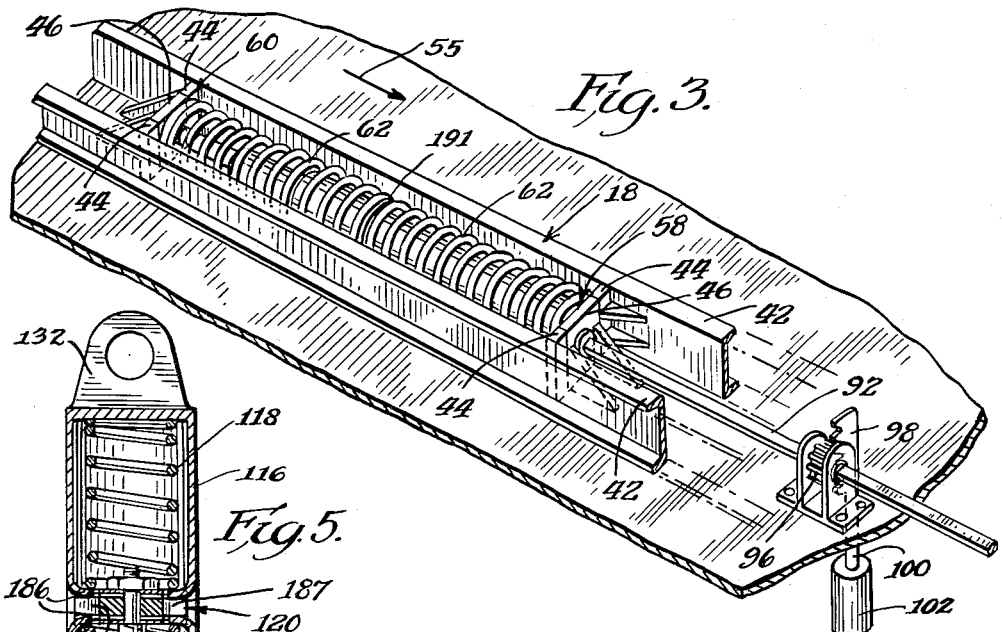
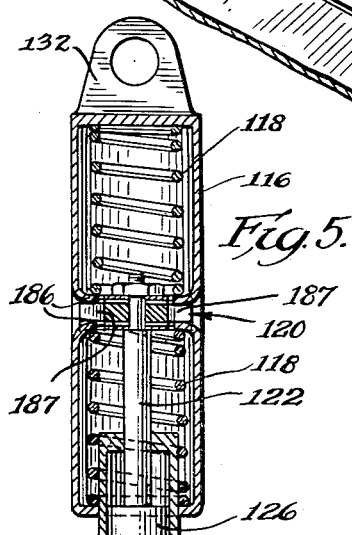
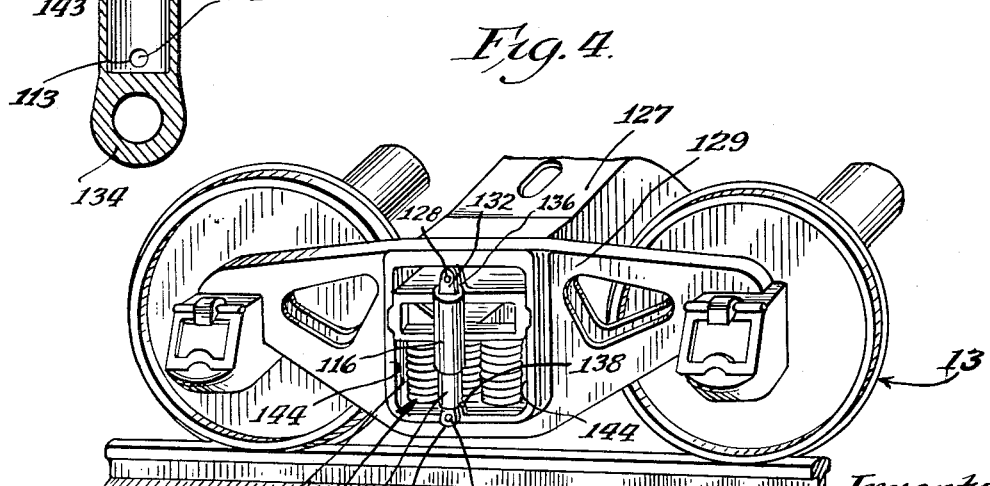
Inventor
William H. Peterson
By Richard J. Myers
Attys.

July 5, 1966   W. H. PETERSON   3,259,252
ADJUSTABLE CUSHIONING ARRANGEMENT FOR RAILROAD CARS
Original Filed Jan. 21, 1963   13 Sheets-Sheet 4
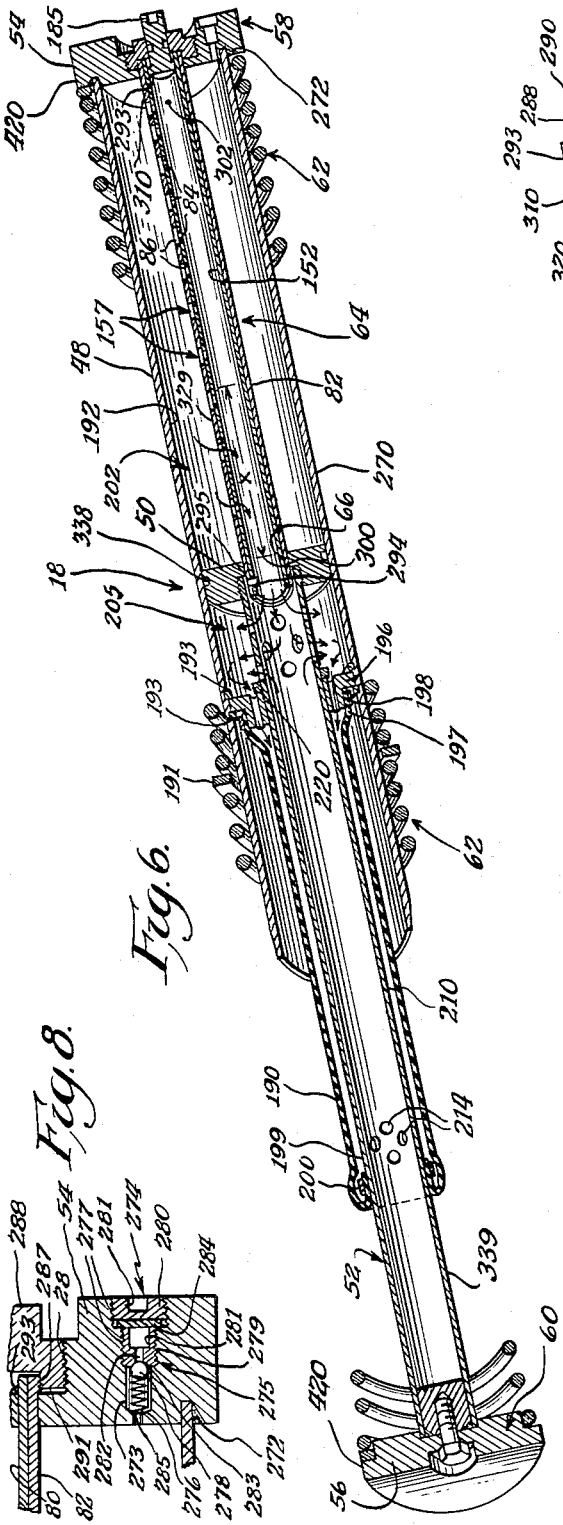
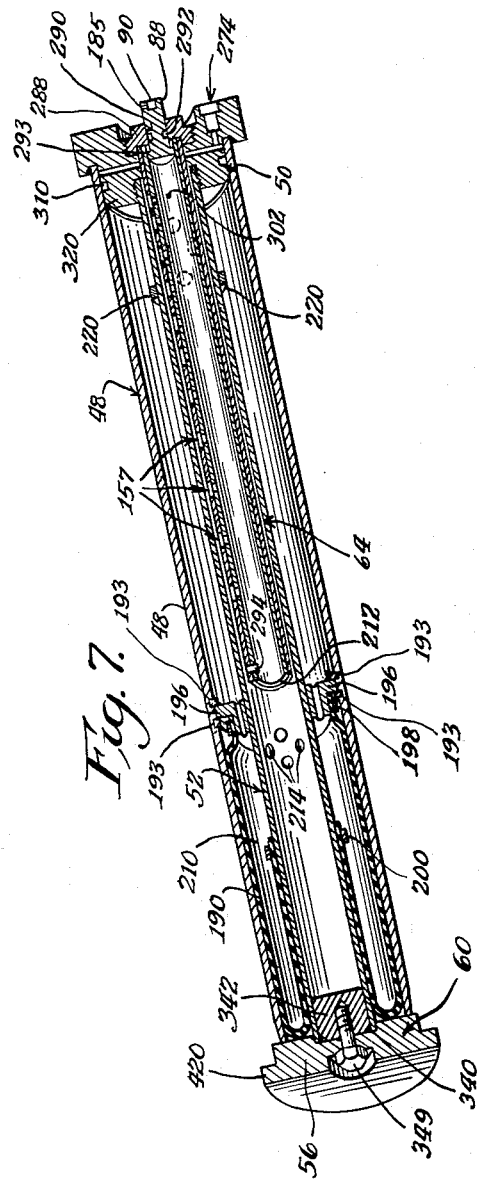
Inventor
William H. Peterson
By Richard J. Myers
Attys.

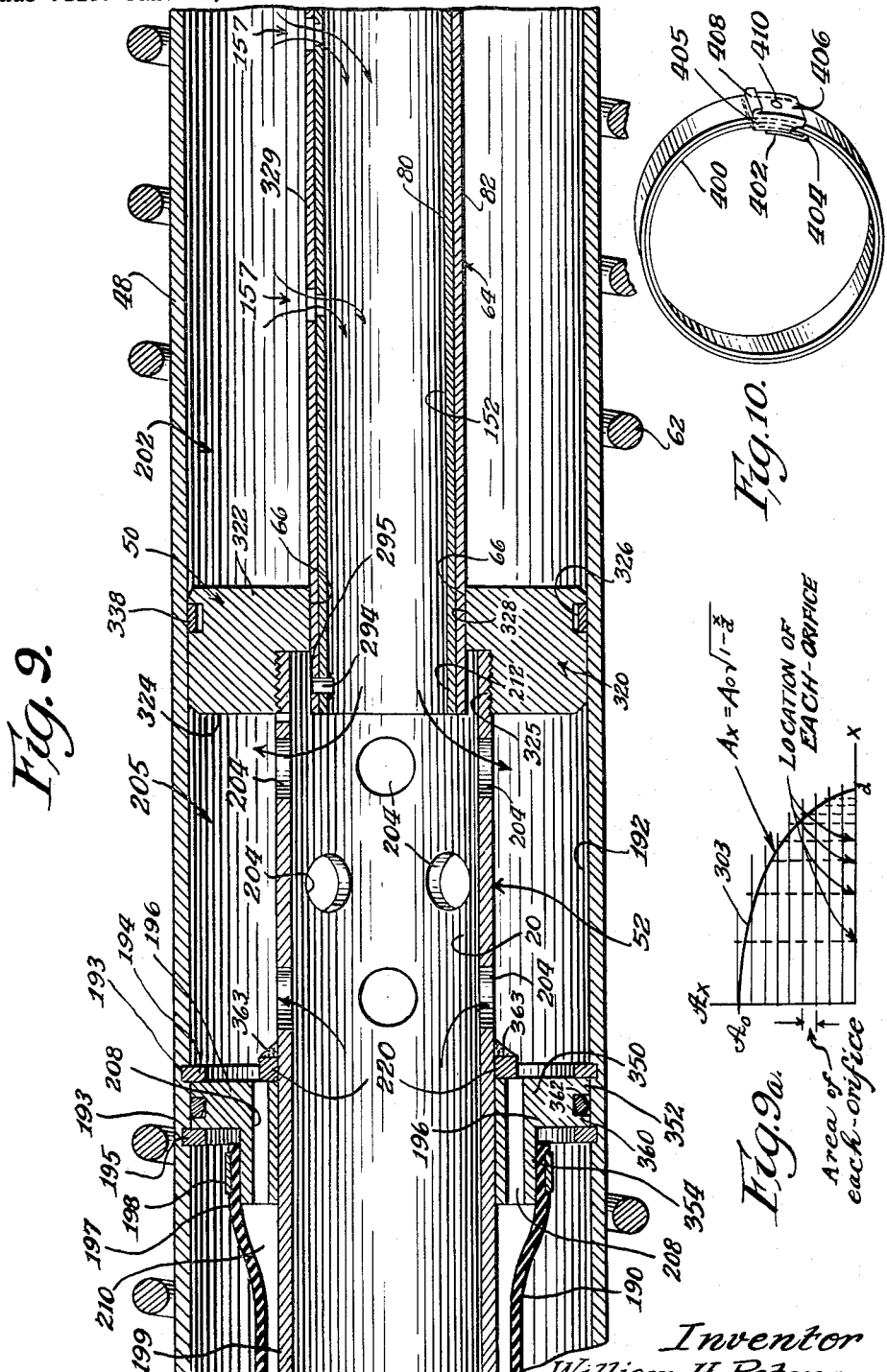

July 5, 1966 W. H. PETERSON 3,259,252
ADJUSTABLE CUSHIONING ARRANGEMENT FOR RAILROAD CARS
Original Filed Jan. 21, 1963 13 Sheets-Sheet 7
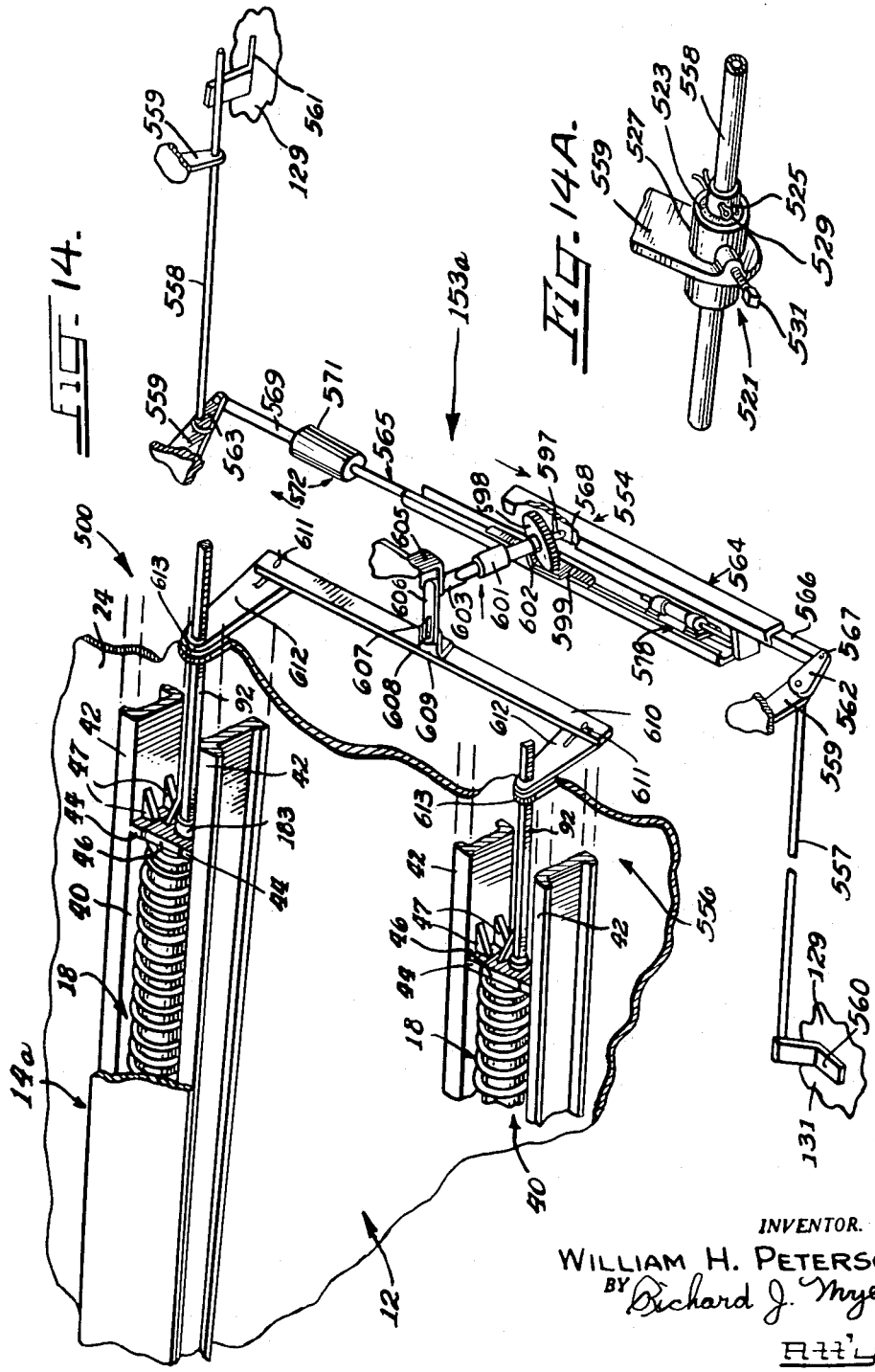
INVENTOR.
WILLIAM H. PETERSON
BY Richard J. Myers
Att'ys.

July 5, 1966 W. H. PETERSON 3,259,252
ADJUSTABLE CUSHIONING ARRANGEMENT FOR RAILROAD CARS
Original Filed Jan. 21, 1963 13 Sheets-Sheet 8
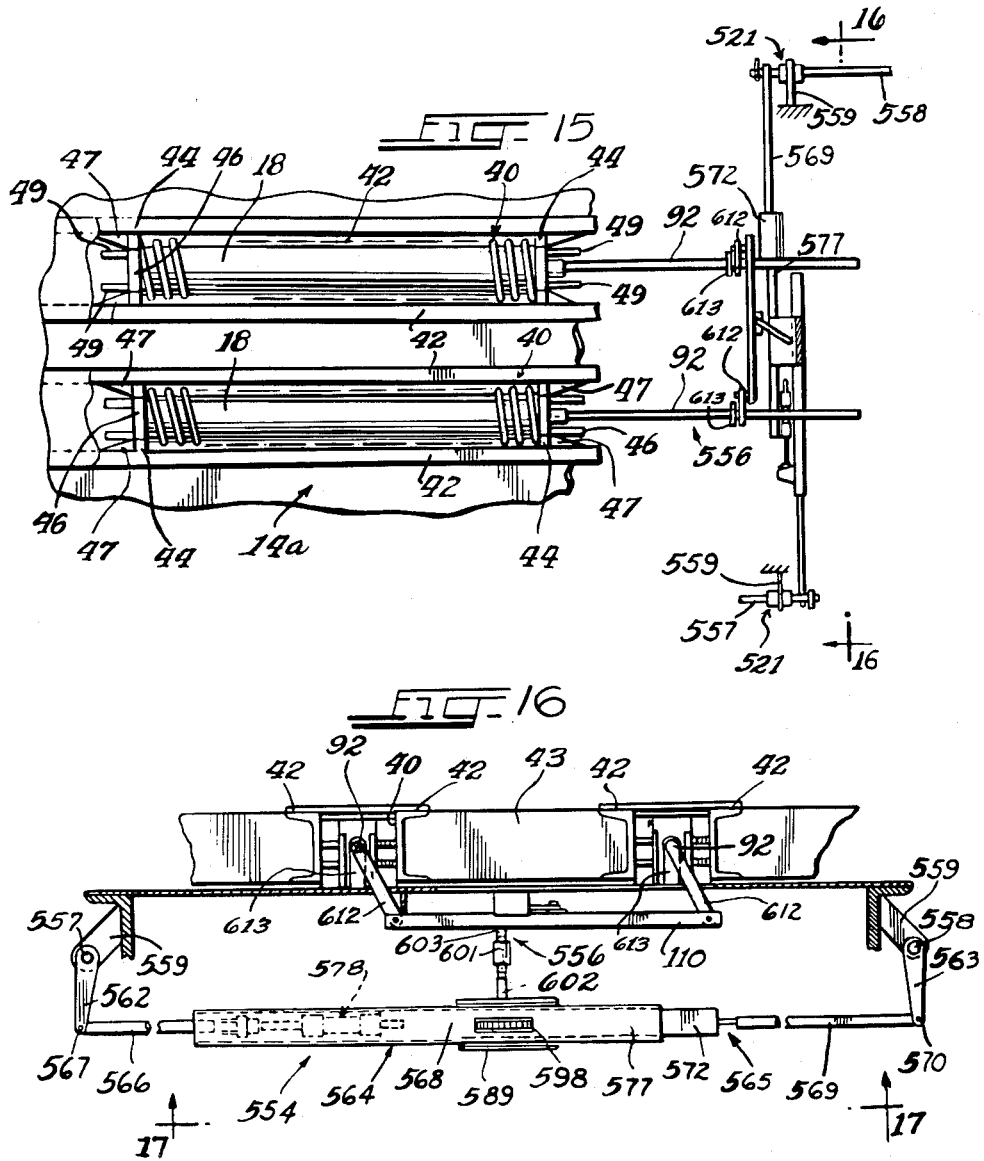
Inventor
William H. Peterson
By Richard J. Myers
Attys.

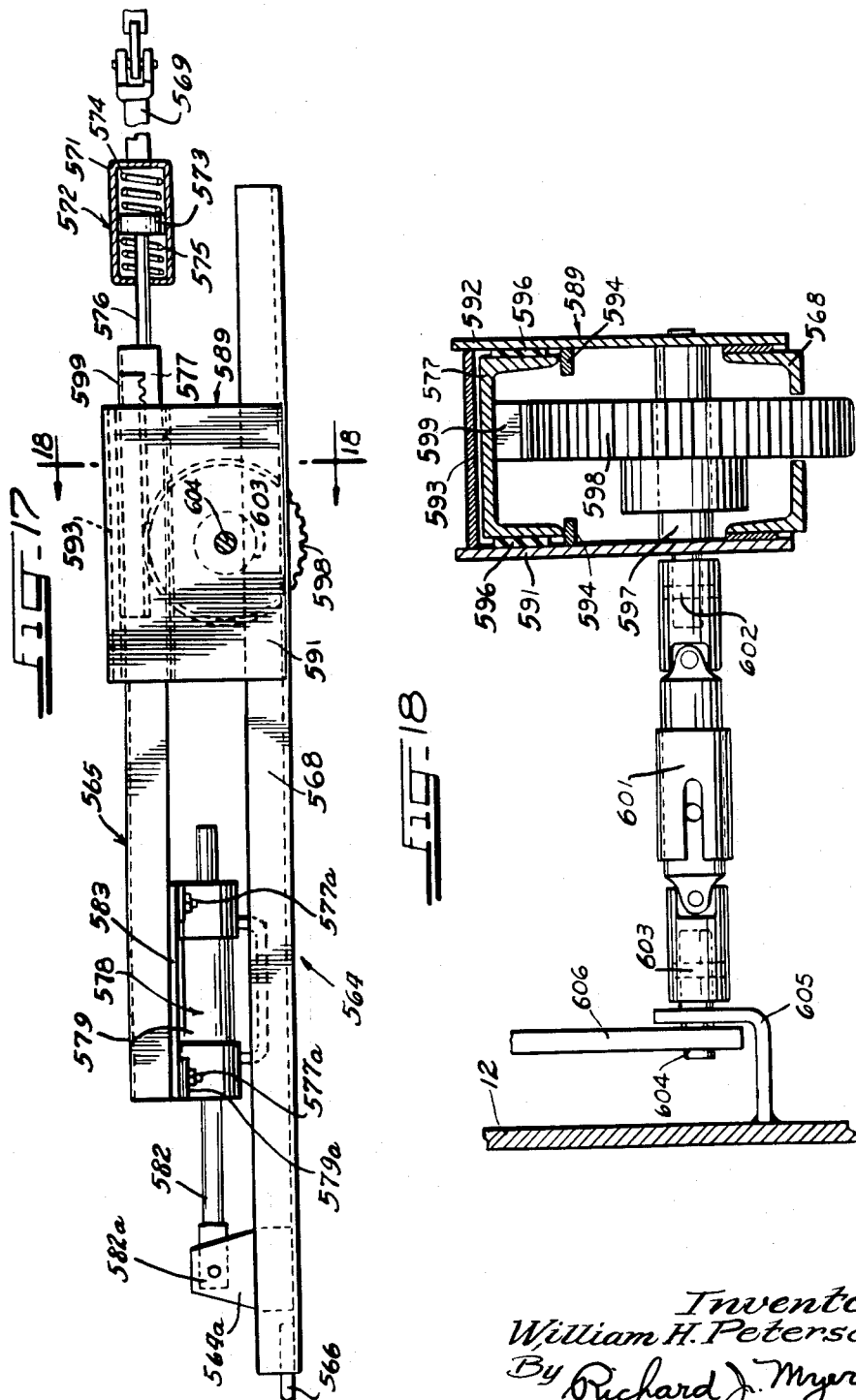

July 5, 1966 W. H. PETERSON 3,259,252
ADJUSTABLE CUSHIONING ARRANGEMENT FOR RAILROAD CARS
Original Filed Jan. 21, 1963 13 Sheets-Sheet 10
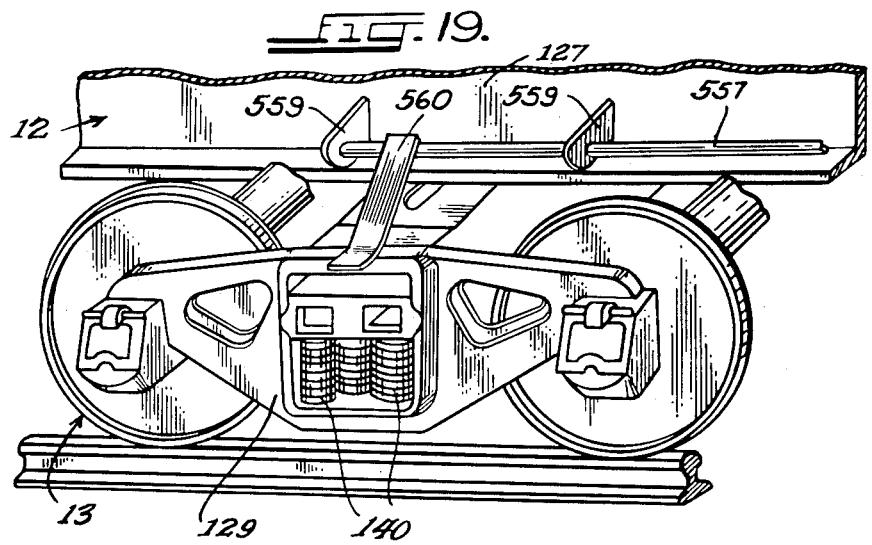
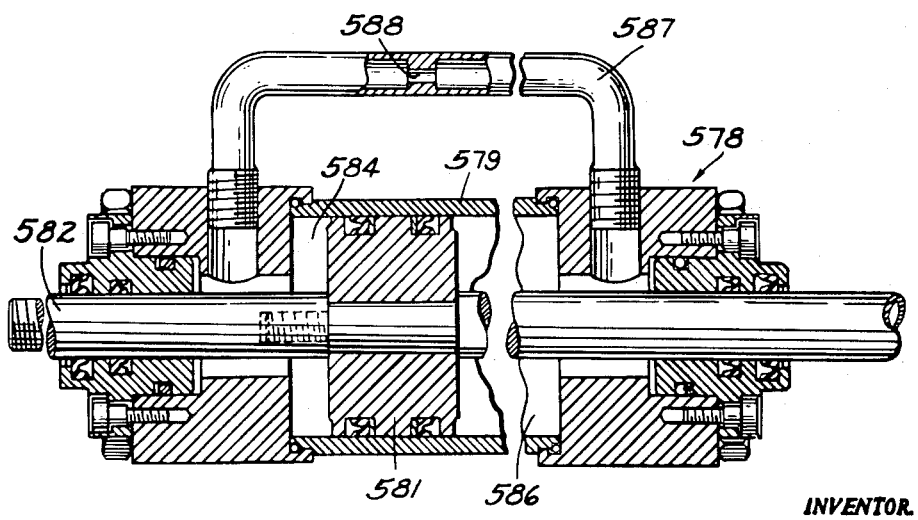
INVENTOR.
WILLIAM H. PETERSON

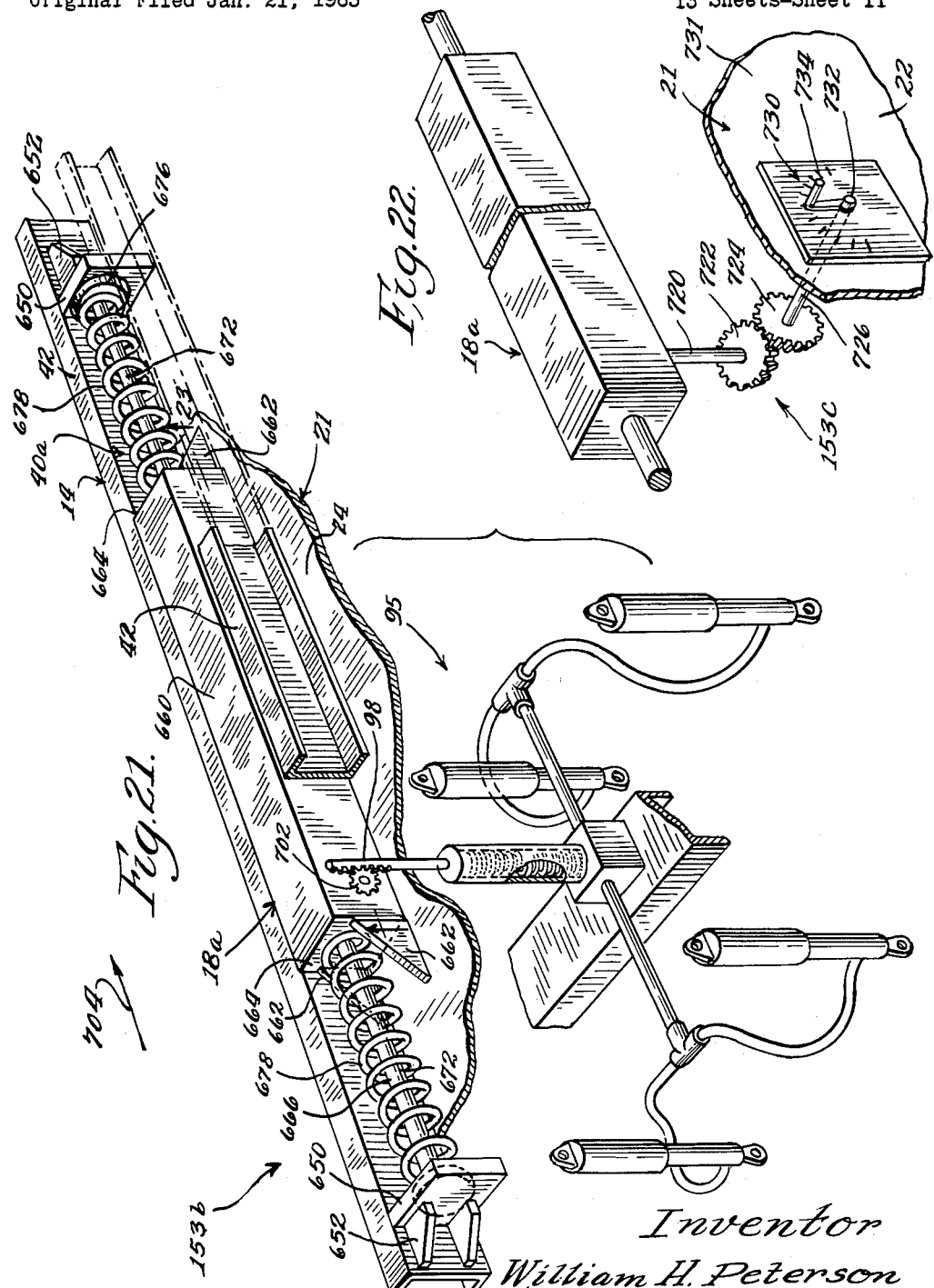

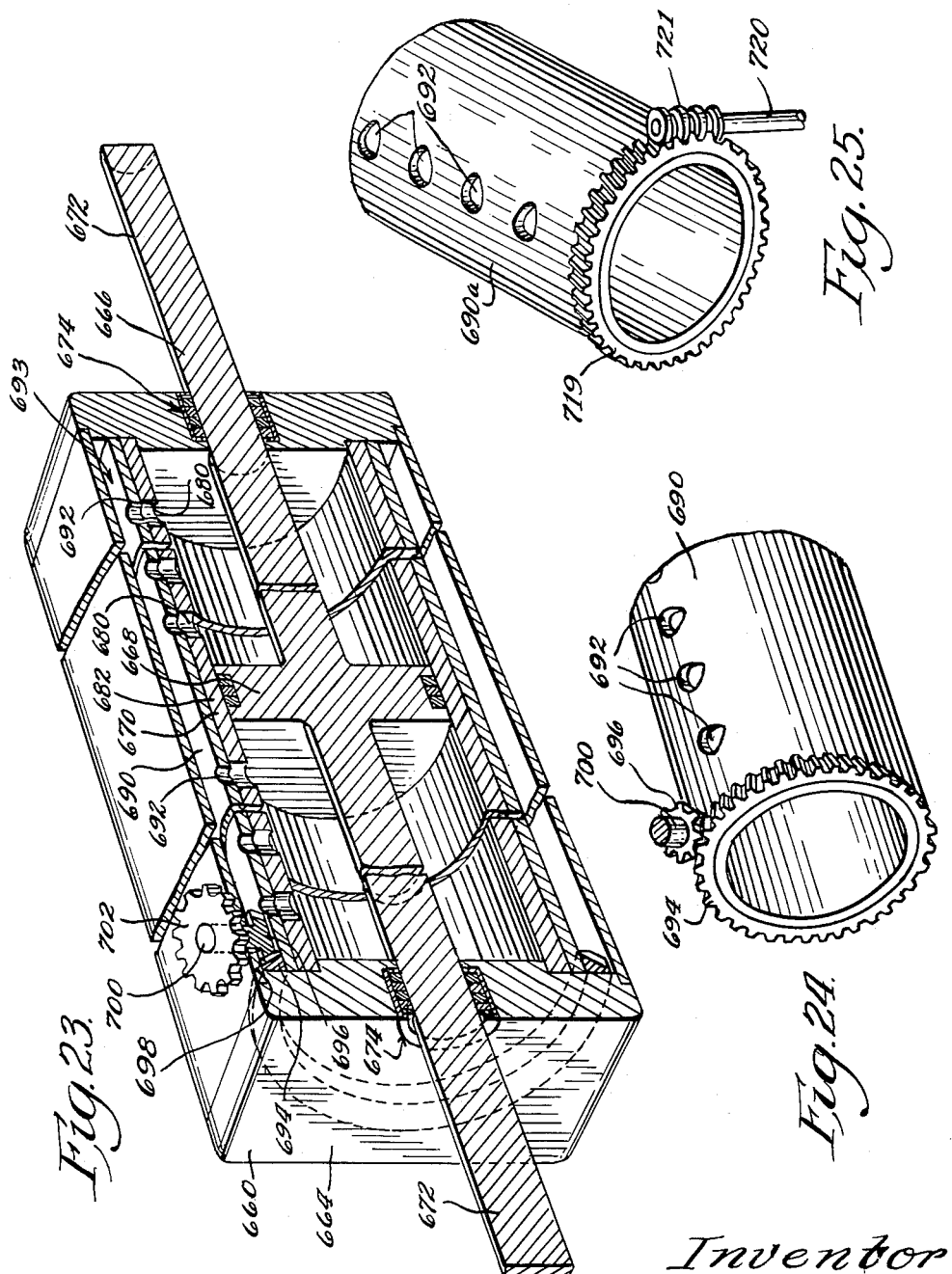

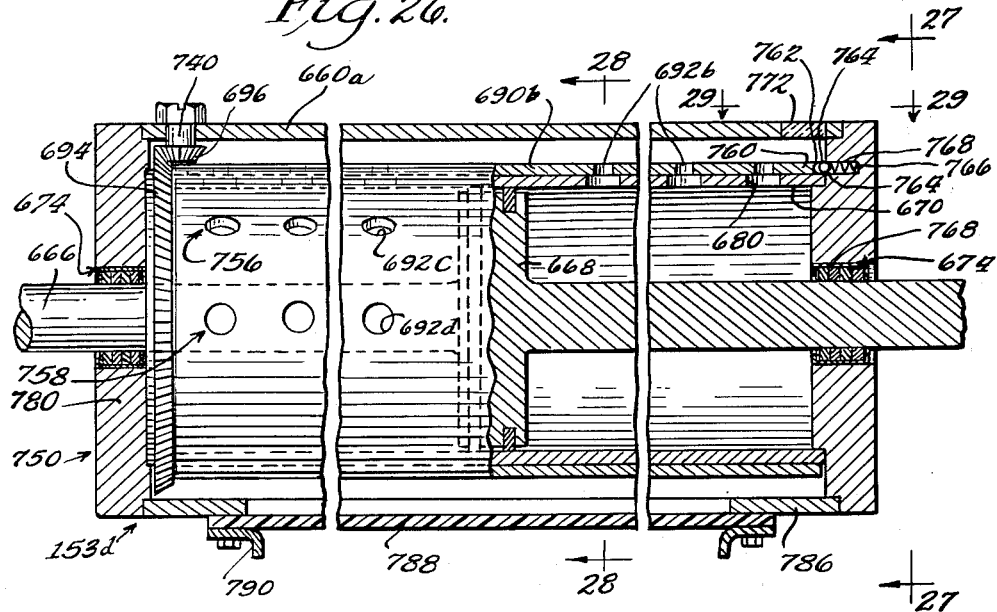
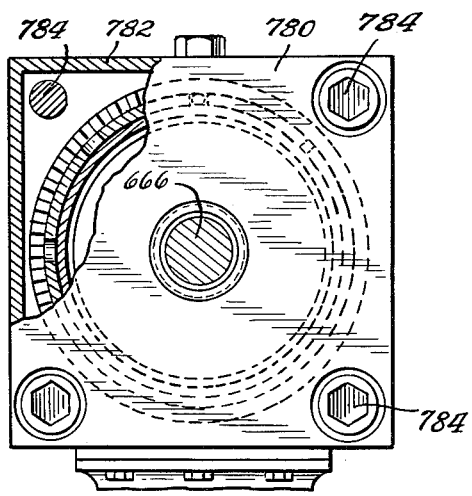
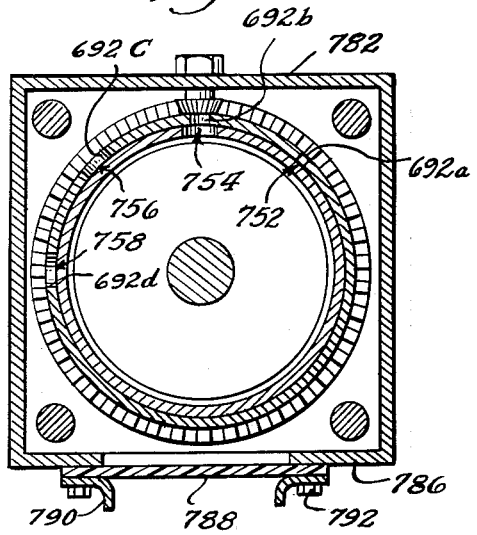
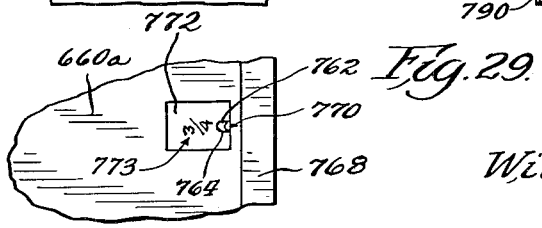

United States Patent Office 3,259,252
Patented July 5, 1966

3,259,252
ADJUSTABLE CUSHIONING ARRANGEMENT FOR RAILROAD CARS
William H. Peterson, Homewood, Ill., assignor to Pullman Incorporated, Chicago, Ill., a corporation of Delaware
Original application Jan. 21, 1963, Ser. No. 253,783, now Patent No. 3,224,386, dated Dec. 21, 1965. Divided and this application Mar. 22, 1965, Ser. No. 441,469
5 Claims. (Cl. 213—43)

My invention relates to an adjustable cushioning arrangement for railroad cars, and more particularly, to railroad car cushioning apparatus of the type incorporating the principles of my application Serial No. 856,963, filed December 3, 1959 (the entire disclosure of which is hereby incorporated herein by this reference) now Patent 3,003,436, granted October 10, 1961, wherein the cushioning apparatus is made adjustable or self-adjusting to take into consideration loading variations that railroad cars experience in day to day service. This patent application is a division of my co-pending patent application having U.S. Serial No. 253,783, filed on January 21, 1963, now Patent No. 3,224,386, which latter application is a continuation-in-part of my abandoned U.S. applications Serial No. 82,259, filed January 12, 1961, and Serial No 154,719, filed November 24, 1961.

My said Patent 3,003,436 teaches a basically new approach to the protection of lading in transit on railroad cars, which is particularly effective in providing damage-free protection to the class of lading that is most critical from the damage claim standpoint, that is, commodities packed in fiber or cardboard boxes and cartons and known as resilient lading.

As disclosed in my said Patent 3,003,436, during any impact situation, changes in the absolute velocity of the lading (which are normally caused by stopping and starting of the car, and by impacts against the car couplers during transit) are effected by adding or subtracting kinetic energy to the lading through the frictional forces acting between the lading and the car as well as the pressure of the car end wall on the lading (the car end wall involved depending upon which car coupler is initially subjected to the longitudinal shock, and whether the shock is in buff or in draft). My said application discloses that damage-free protection against longitudinal impacts (that is, impacts applied against the car couplers) can be obtained if there is interposed between the couplers and the car body containing the lading a cushioning device or arrangement having a cushion travel sufficient in capacity and length that the absolute velocity of the lading is changed to that required by the Law of Conversation of Momentum for Inelastic Bodies by employing to a substantial degree the frictional forces acting between the lading and the car, as distinguished from the compressive forces supplied to the lading by the car end wall. This novel approach involves, among other things, extending the time of closure of the cushioning device employed sufficiently so that the changes that must occur to the absolute velocity of the lading (by reason of the aforementioned Law of Conservation of Momentum) occur to the lading substantially as a unit. The length of travel found essential to U.S. railroad practices is in the range of 20–40 inches, and is preferably on the order of 30 inches.

I have found, as disclosed in my above mentioned application, that a cushion travel in this range permits the inherent stability of the load and the friction between the lading and the car body to act as substantial factors in creating the lading acceleration (either positive or negative) necessary to achieve the absolute velocity dictated by the aforementioned Law of Conservation of Momentum, without developing within the lading the destructive compressive forces which cause lading damage.

The invention of my appliaction Serial No. 856,963 is applicable to a wide variety of railroad car arrangements, including cars especially designed for piggyback freight container system of handling freight as well as the familiar boxcars, flatcars and other standard designs. These arrangements preferably include the long travel cushioning device of my applications Serial No. 782,786, filed December 24, 1958, now Patent 3,035,827, granted May 22, 1962 and Serial No. 9,785, filed February 19, 1960, now Patent 3,035,714, granted May 22, 1962 to control the long travel cushioning action.

As described in my said Patent 3,003,436, these devices are approximately 100 percent efficient cushion travel devices, meaning that they transmit essentially only that portion of the kinetic energy necessary to satisfy the Law of Conservation of Momentum, and that they dissipate substantially all of the rest of the kinetic energy required to accomplish an inelastic impact, with the exception of energy that is stored in return springs necessary to recenter the devices and the energy involved in lading friction, elastic structural deflection, noise, and the like. In other words, the above indicated 100 percent efficient cushion travel cushion device is one that transfers and dissipates the required energy with minimum travel and with no recoil, and requires that the cushioning device have substantially constant force travel characteristics.

The long travel cushioning devices of my Patents 3,035,827 and 3,035,714 are double acting hydraulic cylinder piston arrangements in which the impetus of coupler impacts is dissipated by forcing hydraulic liquid through an orifice or orifices at a metered rate, as determined by a metering pin which varies the effective size of the orifice openings, over the length of closure stroke of the cushion, as required to obtain the cushioning force travel characteristic desired. Preferably, the constant force travel characteristic described in my Patent 3,003,436 is employed.

One of the most difficut problems in this art is that cushioning devices employed to cushion coupler impacts must be fully effective regardless of whether the car is empty, partially loaded, or fully loaded, and at impact speeds up to collision magnitudes. In cushion underframe and cushion body railroad cars of standard capacity, the fully loaded versus empty weight ratio is on the order of 2½ or 3 to 1, but this is not nearly so critical as in railroad car apparatus arranged to carry freight containers, since containers may weigh anywhere from 5,000 pounds to 130,000 pounds (depending upon the size of the container, the type of lading carried, and whether or not the container is fully loaded).

One example of the application of my invention described in my Patent 3,003,436 is shown in that patent applied to a container system of handling freight wherein a container supporting carriage or rack structure is applied to the bed of a standard freight car, with one of my long travel cushioning devices interposed between the carriage or rack and the car bed to protect the containers and their lading from coupler impacts. It is in this type of arrangement that load weight variations make it essential that the cushion devices permit adjustment of their closure characteristics, if the cushion rack is to have the versatility required for full utilization of the freight container system approach.

The reason for this is that hydraulic cushioning devices that are to be used for cushioning coupler impacts and that are to be of the substantially constant force travel type are conventionally designed to provide the constant force travel closure characteristic at some load condition of the particular type car to which the cushion is to be applied, such as a desired full load condition. And, therefore, the metering structures of these cushioning devices have been fixed in nature in that no way was provided to change the effective areas of the orifice openings involved (even in hydraulic cushions of the type employing removable metering pins, the metering pin is conventionally fixed in its operation position, and the only way to change the force travel characteristics of the cushion is to replace the metering pin).

Experience has shown that, in connection with the fixed metering pin type cushion, so long as the type of car for which it is designed is impacted under load conditions reasonably approaching the optimum full load condition for that car, the desired substantially constant force travel closure characteristic of the cushion will be provided.

And, in cushion underframe and cushion body cars (for instance, boxcars) of standard capacity the difference in empty weight versus fully loaded weight is not sufficient to cause an unworkable departure from the desired constant force travel characteristic under lightly loaded or empty impact conditions.

However, in the case of container cars of the type mentioned, where the car is empty or greatly underloaded, the cushion force travel characteristic may seriously depart from the desired constant force travel type to the extent that an undesirably high cushion force would be experienced at the beginning of the closure stroke which would drop off rapidly as travel proceeds, with the result that a severe impulse could be transmitted adjacent the beginning of the closure stroke, to the load acually carried, that might cause lading damage. Under severe underload conditions, the main force impulse imposed on the container (being cushioned) by the cushion will occur at or adjacent the beginning of the cushion closure stroke, prior to the time the lading takes to reach maximum compaction, which is contrary to the concepts disclosed in my Patent 3,003,436.

And where the container car is overloaded, the force travel curve of the cushion will depart, at the end of the closure stroke, from the desired constant force travel characteristic to exhibit a sharp increase in force applied to the container that may cause damage. Since the lading will have already reached a high degree of compaction by the time this sharp force increase is experienced, and thus temporarily is more rigidly connected to the car than under normal circumstances, the lading will be more sensitive to cushion force variations so that sharp rises in cushion force at the end of the cushion will be reflected in sharp rises in lading force that could cause damage.

It is therefore a principal object of this invention to provide a hydraulic coupler impact cushioning arrangement for railroad equipment wherein the cushion device may be adjusted to provide approximately the most effective protection for the load actually carried by a particular car at the time of impact.

Another principal object of the invention is to provide a hydraulic coupler impact cushioning arrangement for railroad equipment wherein the cushioning device is adjustable, either automatically or manually to insure the provision of a force travel closure characteristic that reasonably approaches the optimum constant force travel type for all loads up to the maximum capacity of the car.

Prior to my invention disclosed in my Patents 3,035,827 and 3,035,714, hydraulic cushioning devices had been considered impractical for use in railroad cars, to absorb longitudinal impacts, because of oil leakage and excessive manufacturing costs and maintenance. As brought out in my said Patents 3,035,827 and 3,035,714, I have determined that much of the oil leakage can be laid to the sliding or dynamic seals that are employed and the liquid pressures. Furthermore, sliding or dynamic oil seals, by their very nature, require close manufacturing tolerances to be operative and the machining thus made necessary forms a substantial part of the overall manufacturing cost. And, of course, the excessive oil leakage requires too frequent inspection and servicing to keep maintenance costs at economical levels.

One of the principal advantages of the invention described in my said Patent 3,003,436 is that the long travel cushioning action contemplated by that invention insures that hydraulic operating pressures are reduced to practical operating ranges, which in addition to making hydraulics available for absorbing impacts in the railroad field, also tends to offset some of the disadvantages of sliding or dynamic seals. However, it becomes apparent to me that sliding or dynamic seals must be eliminated from hydraulic cushioning devices to avoid the leakage problem, that the cushioning components must admit of more simplified minimunal manufacturing steps to make hydraulic cushions attractive to the railroad industry, and that the cushioning device as a whole must be devised to make infrequent inspection and servicing the rule rather than the exception.

Therefore, a further principal object of this invention is to provide a simplified low cost long travel hydraulic cushion device in which sliding seals are eliminated.

Another important object of my invention is to provide a hydraulic cushion device which is arranged to space high pressure liquids from parts of the device where leakage problems are most acute, which is arranged to effect maximum dissipation of heat that is generated when impacts are absorbed, and which substantially eliminates the need for expensive machining operations during manufacture of the device.

Yet other objects of the invention are to provide a self-adjusting cushion arrangement for railroad cars wherein the resistance of the cuhsion to the impetus of impacts is automatically adjusted in accordance with the actual weight of any given load applied to the car, to provide an improved long travel cushioning device for effecting the benefits of my Patent 3,003,436, to provide long travel hydraulic cushioning devices permitting ready automatic or manual adjustment of the metering orifice area under operating conditions, and to provide cushioning devices and arrangements that are inexpensive of manufacture, convenient to install and efficient in operation.

Other objects, uses and advantages will be obvious or become apparent from a consideration of the following detailed description and the application drawings.

In the drawings:

FIGURES 1A and 1B when considered together form a composite diagrammatic perspective view of one embodiment of the special skeleton car and cushion rack arrangement for freight containers that is disclosed in the copending application of Jack E. Gutridge, Ser. No. 21,331, filed April 11, 1960, which incorporates the long travel principles of my Patent 3,003,436, and which is here disclosed for purposes of illustrating the type of railroad equipment that my present invention benefits most;

FIGURE 3 is a view similar to FIGURE 2, but showing the cushion pocket more in detail;

FIGURE 4 is a fragmental diagrammatic prespective view of one side of a railroad car truck, illustrating the manner in which the sensing devices of FIGURE 2 are applied thereto;

FIGURE 5 is a sectional view through one of the sensing devices along its longitudinal axis;

FIGURES 6 and 7 are diagrammatic perspective views, in section, illustrating the details of an improved form of hydraulic cushion device adapted for application to the car and cushion rack of FIGURES 1A and 1B in accordance with the present invention;

FIGURE 8 is a fragmental sectional view, on an enlarged scale, of the right hand end of the hydraulic cushion device of FIGURES 6 and 7;

FIGURE 9 is a fragmental cross-sectional view of the cushion device as positionted in FIGURE 6, but on an enlarged scale;

FIGURE 9a is a graph dealing with the arrangement of the hydraulic cushion metering pin;

FIGURE 10 is a perspective view diagrammatically illustrating a hose clamp of the type suitable for use in the cushion of FIGURES 6 and 7;

Figure 13:
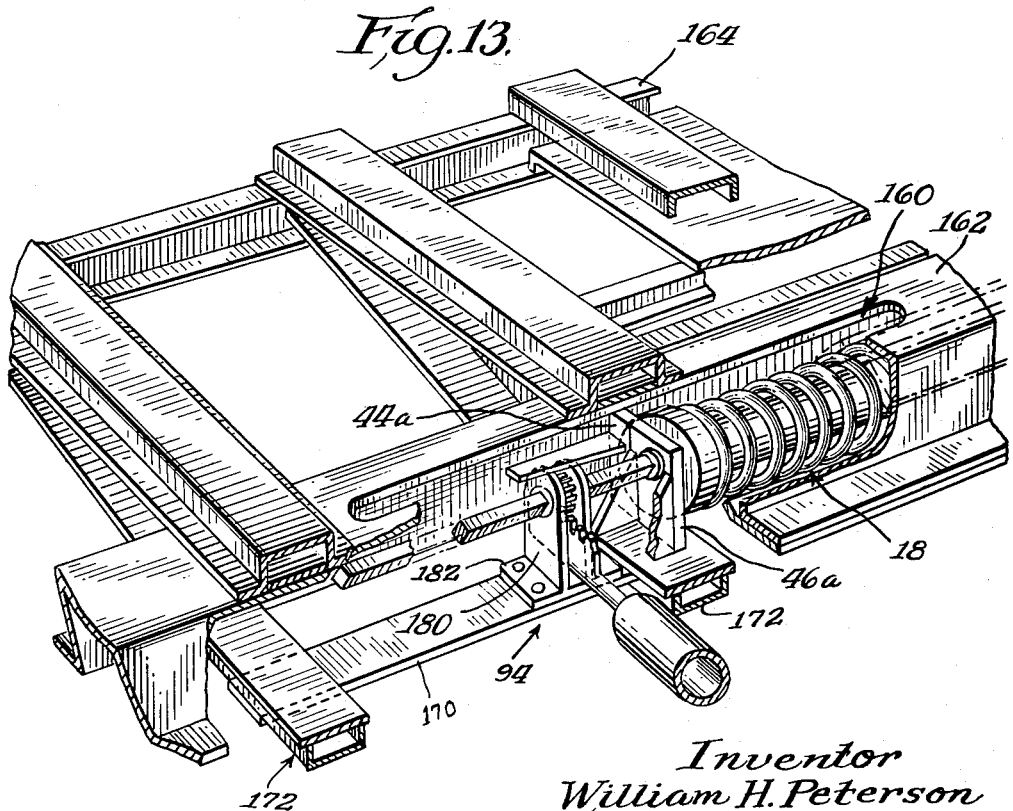

FIGURE 13 disgrammatically illustrates the principles of the invention applied to the cushion body car disclosed in my application Ser. No. 25,128, filed April 27, 1960, which car may include a body of standard boxcar design or the like for carrying lading in the more conventional manner;

FIGURE 14 is a fragmentary perspective view illustrating a modified form of this invention, showing a pair of cushioning devices of the type illustrated in FIGURES 6 and 7 applied to the car and diagrammatically illustrating a mechanical arrangement for automatically adjusting these cushioning devices to vary the resistance thereof in accordance with the load actually on the car;

FIGURE 14A is a fragmentary perspective view illustrating a resilient bushing device that forms a part of the embodiment of FIGURE 14;

FIGURE 15 is a fragmentary to plan view of the railway car cushioning arrangement shown in FIGURE 14;

FIGURE 16 is an elevational view taken substantially along the line 16—16 of FIGURE 15;

FIGURE 17 is a bottom plan view taken substantially along the line 17—17 of FIGURE 16;

FIGURE 18 is a cross-sectional view taken substantially along the line 18—18 of FIGURE 17;

FIGURE 19 is a fragmentary diagrammatic perspective view of one side of a railroad car truck illustrating the manner in which the weight-sensing devices of the embodiment of FIGURES 14–18 are applied thereto;

FIGURE 20 is a cross-sectional view taken substantially along line 20—20, specially illustrating a device employed in the embodiment of FIGURES 14–19 to avoid adjustment of the cushion during normal rapid flexing of the truck springs;

FIGURE 21 is a diagrammatic perspective view on the order of that of FIGURE 3, but illustartting a different form of cushioning device associated with the weight sensing arrangement of FIGURES 1–13;

FIGURE 22 is a diagrammatic perspective view of the cushion device of FIGURE 21 as associated with a linkage arrangement for manually adjusting the cushion;

FIGURE 23 is a diagrammatic perspective view on the order of that of FIGURE 6, but taken substantially along line 23—23 of FIGURE 21, illustrating the specifics of the cushion shown in FIGURES 21 and 22;

FIGURE 24 is a fragmental diagrammatic perspective view of the cushion metering adjustment sleeve of the cushion of FIGURES 21 and 23;

FIGURE 25 is a view of the adjustment sleeve arranged for adjustment in accordance with the embodiment of FIGURE 22;

FIGURE 26 is a longitudinal cross-sectioinal view through the modified cushion device of which the adjusting arrangements forms a part;

FIGURES 27 and 28 are views substantially along lines 27—27 and 28—28, respectively; and FIGURE 29 is a fragmental plan view substantially along line 29—29 of FIGURE 26.

However, it should be understood that the sepcific disclosure which follows is for the purpose of complying with Section 112 of Title 35 of the U.S. Code and the appended claims should be construed as broadly as the prior art will permit consistent with the disclosure herein made.

General description

Referring now more particularly to the diagrammatic showing of FIGURES 1A and 1B (which illustrate a specific railroad car structure that is especially well suited for use in practicing the principles of the present invention), reference numeral 10 generally indicates one of the cushion rack-skeleton car arrangements of said Gutridge application Serial No. 21,331 (the disclosure of which is hereby incorporated herein by this reference), which includes a skeletonized car underframe 12 riding on conventional trucks 13 and carrying a container support carriage, platform, or rack 14, which is mounted for movement longitudinally of the car underframe on support assemblies 16 that in the form illustrated include rollers 17 that ride on top of underframe 12. Suitable guide devices 19 on either side of underframe 12 define the path of movement of the rack 14 with respect to the underframe 12.

Interposed between the carriage or rack 14 where indicated by reference numeral 18 is a long travel cushioning device of the type contemplated by my said Patent 3,003,436, the structural features of which are shown in FIGURES 6–10.

The arrangement is preferably such that the cushion device 18 has a closure travel on the order of 30 inches and the car underframe 12 and platform or carriage 14 are proportioned to permit this relative movement between the two, as when coupler impacts are occasioned.

The railroad car underframe 12 comprises a center sill structure 21 of inverted open box-like configuration in transverse section, which is made up of a pair of spaced sill members 22 disposed in parallel vertical planes and joined together at their tops by top plate structure 24 on which the carriage or rack 14 rides. These sill members are relatively wide or deep at their middle portions 25 and relatively narrow at their end portions 26 to provide the center sill structure 21 with relatively deep and relatively narrow center and end portions 28 and 30, respectively. The sill members 22 below their top edges may be joined together along their center portions by spaced diaphragms 32 and angle members 34.

The platform or carriage 14 is formed by longitudinally extending sill members 36 affixed to the support assemblies 16 and having a transverse spacing comparable to the spacing between the underframe sill member 22.

The cushion device 18 is disposed in a cushion pocket 40 defined by the longitudinally extending frame members 42 that are applied between the transverse framing members 43 of adjacent support assemblies 16 and have fixed thereto spaced lugs 44 (see FIGURES 2 and 3) that define the ends of the cushion pocket (see FIGURE 3). Between each pair of aligned lugs 44 is mounted a stop member 46 that is fixed to the center sill 12 in any suitable manner, as by welding. Lugs 44 and stop members 46 may be braced in any suitable manner, as by employing the strengthening webs 47 and 49 illustrated.

The cushion device 18 generally comprises a cylinder 48 (see FIGURES 6 and 7) and a piston head 50 having affixed thereto a tubular piston rod 52 which projects outwardly of the cylinder 48. The heads or closures 54 and 56 of the cylinder 48 and piston rod 52, respectively, form cushion followers 58 and 60 that are respectively held against the respective pairs of spaced lugs and stop members by high strength compression springs 62.

The cushion device 18 here disclosed further includes a metering pin 64 of improved characteristics carried by the cylinder closure 54 and projecting through a central orifice opening 66 formed in piston head 50.

The cushion device 18 is double acting as it effects a cushion transfer of impacts applied to either end of the car 10, and it is preferably provided with a substantially constant force travel closure characteristic, as controlled by the functioning of metering pin 64, in accordance with the teachings of my Patent 3,003,436.

The cushion pocket 40 may be closed by a removable to plate 70 applied between the framing members 42, as by employing suitable bolts (not shown).

The containers adapted to be carried by car 10 are generally indicated at 74 in FIGURES 1A and 1B. These containers may be of any conventional design though preferably they are of simple box-like construction with suitable doors applied where necessary and desirable, and carry suitable eyes 76 at their upper corners for crane lifting between the railroad car and a truck chassis or loading dock.

As described in said Gutridge application, the sill members 22 of the car underframe 12 and the sill members 36 of the container support platform or rack are given the same spacing as the spacing that is normally employed between the longitudinal framing members of highway vehicle chassis (which is usually in the range of between 34 and 40 inches). Also, the containers are secured to the cushion rack and chassis by identical latching devices 75 which each comprise a bracket structure 76 including a cone-shaped protuberance 78 that is adapted to be received in an appropriately shaped recess formed in the undersurface of the respective container. The latching devices 76 also include suitable pins (not shown) that are adapted to be received through aligned holes formed in the bracket structure and container, respectively, to secure the two together, with the pin being screw-threaded into position in the container or being held in place by a suitable latch.

The bracket structures 76 are applied, in transversely disposed pairs, to the chassis frame longitudinal members and the container support platform or rack sill members 36, respectively, with a standard spacing longitudinally of the chassis frame members and platform or rack sill members being employed between pairs of bracket structures, for instance, such as required for supporting a container having a nominal 20 foot length.

In the showing of FIGURES 1A and 1B, the bracket structures 76 intermediate the ends of rack 14 are hinged to the respective support assemblies 16 so that they may be disposed in an out of the way position whereby, for instance, containers having a nominal length of 40 feet may be applied to the cushion rack, somewhat as indicated in FIGURES 1A and 1B.

However, it is apparent that the longitudinal spacing of the container support brackets 76 may conform to any desired standard so long as consistency is observed. Alternatively, they may be made adjustable along the sills they are mounted on to accommodate varying container lengths.

It will therefore be seen that the car 10 is adapted to carry containers of varied lengths and capacities, and since each container may very well be loaded at a different shipping point, the individual container loads will be of a different character and weight. Furthermore, the containers may not be entirely filled, or shipped empty, or possibly one or more containers might be omitted from the car, when the car 10 is readied for rail transit. Obviously, considerable load weight variation will be occasioned by the car in its day to day use. Nevertheless, the hydraulic cushion device 18 must be relied upon to provide adequate cushioning for both the light and heavy loads that are carried by the car.

In accordance with this invention, the resistance that the cushion 18 offers to the impetus of coupler impacts is or may be adjusted as the weight on the car 10 is varied to provide a cushion or resistance force that is most effective for the weight actually carried, which involves providing substantially constant force travel closure characteristics for both light and heavy loads, and this is done in the embodiment of FIGURES 1–12 by providing a special metering pin arrangement having adjustable orifice openings that are varied through the operation of weight sensing devices associated with the car truck bolster support springs.

Thus, the metering pin 64 of this invention comprises a rotatably mounted inner tubular member or sleeve 80 and an outer relatively fixed tubular member or sleeve 82, which are cylindrical in configuration and are concentrically and complementarily arranged (see FIGURES 6, 7, 9 and 11). Tubular members 80 and 82 are respectively formed with similarly spaced and shaped ports 84 and 86, respectively, with the tubular members or sleeves 80 and 82 being arranged so that the outer diameter of member 80 substantially complements the inner diameter of member 82, and the ports 84 and 86 are located for positioning in substantial alignment transversely of the metering pin (see FIGURE 6). As hereinafter described in detail, ports 84 and 86 are spaced and positioned lengthwise of pin 64 so that in any position of tubular member 80 with respect to tubular member 82 that permits liquid flow through ports 84 and 86, the cushion 18 will have for the car load condition corresponding to such position of member 80 a force travel closure characteristic that reasonably approximates the desired substantially constant force cushion closure travel that is taught by my Patent 3,003,436.

Figure 2:
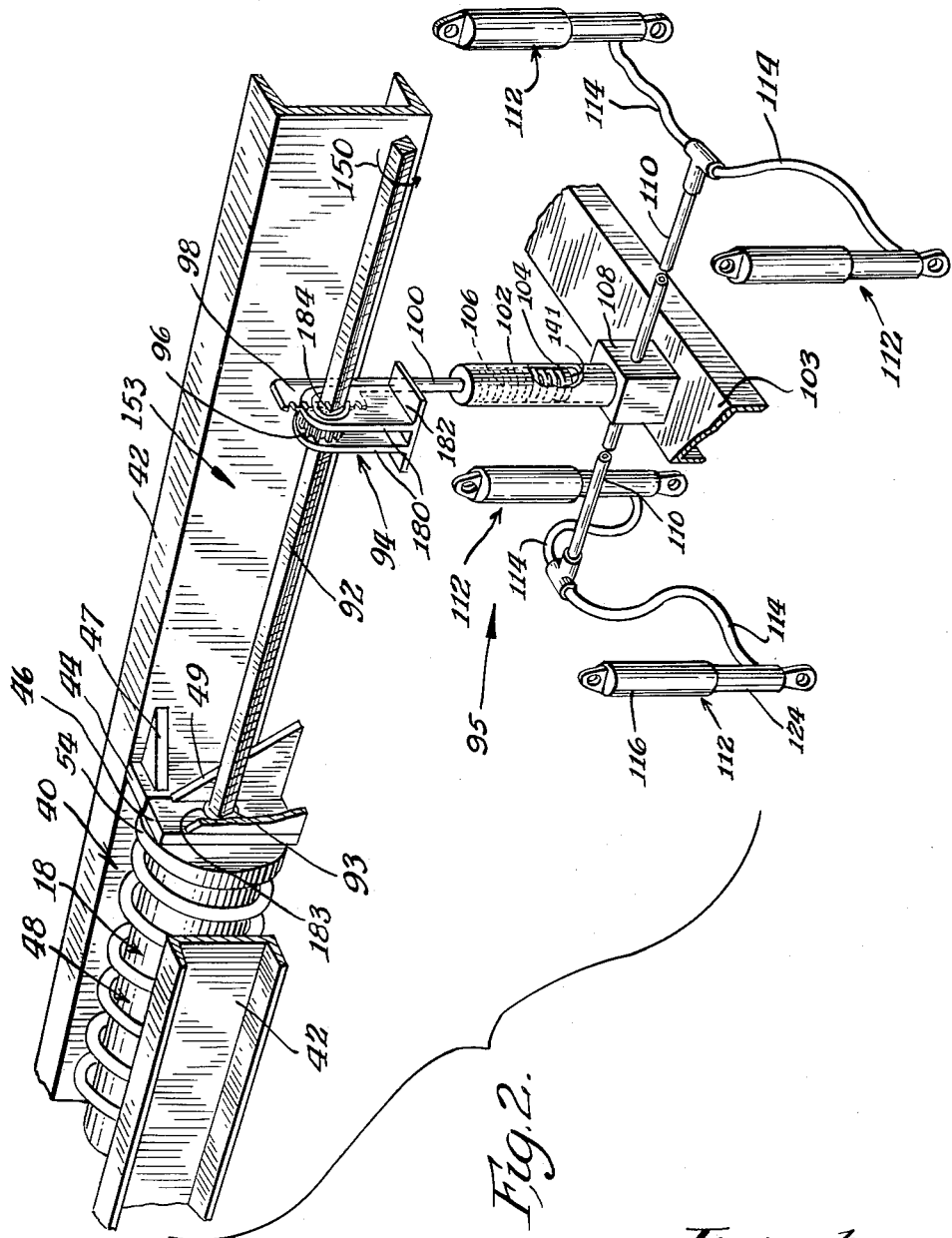
FIGURE 2 is a diagrammatic fragmental perspective view looking from the far side of the car as shown in FIGURES 1A and 1B, illustrating a portion of the cushion pocket employed in the cushion rack of FIGURES 1A and 1B, including one end of the cushioning device and its associated structures and showing one arrangement for making the hydraulic cushion self-adjusting.
Figure 11:
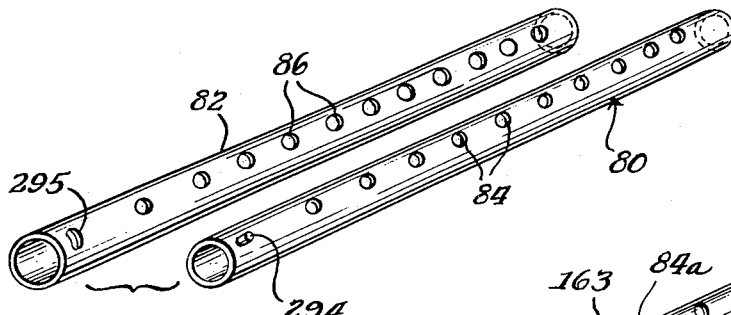
FIGURE 11 is a diagrammatic perspective view showing the internal and external portions of the metering pin (of the device of FIGURES 6 and 7) in side by side relation.

The tubular member 82 is fixed, as by welding, to the closure member 54 of cylinder 48 while the tubular member or sleeve 80 is fixed, as by welding, to a stud or connector body 88 rotatably mounted in closure 54 and formed with a socket 90 to receive one end of a connector rod or member 92 (see FIGURES 2 and 3) that projects from the closure member 54 through an appropriate opening 93 formed in the adjacent stop member 46 and outwardly of the cushion pocket 40 between the two framing members 42 and is operated by weight sensing arrangement 95 (see FIGURE 2).

The connecting rods or member 92 is journalled in an appropriate bracket structure 94 and has keyed thereto gear 96 which meshes with a rack member 98 for sensing arrangement 95 that is fixed to piston rod 100 projecting from a suitable hydraulic cylinder 102 that may be fixed in any suitable manner to the underframe 12, as by being mounted on beam 103 extending between and fixed to sill members 22. Piston rod 100 is fixed to a piston 104 (see FIGURE 2) reciprocably mounted in hydraulic cylinder 102 and biased toward the head end of cylinder 102 by an appropriate spring 106. The head end of the cylinder 102 is in communication with a suitable manifold device 108 from which extend hydraulic conduiting 110 that are connected to ports 113 of sensing devices 112 by conduiting 114.

As indicated in FIGURE 5, the sensing devices 112 each comprise a tubular actuator sleeve 116 having mounted therein prestressed compression springs 118 that bear against a washer structure 120 on one end of a piston rod 122 which extends within a single acting hydraulic cylinder 124 in which it is fixed to a suitable piston 126. The actuator sleeve 116 and the hydraulic cylinder 124 of the respective sensing devices 112 are each secured to the truck bolster 127 and truck frames 129 in the manner suggested by FIGURE 4 wherein pins 128 and 130 are applied between the lugs 132 and 134 of these elements and similar lugs 136 and 138, respectively, of the truck bolster and side frame. Hydraulic liquid of a suitable type fills the spaces in cylinder 102, manifold 108, conduits 110 and 114, and cylinder 124 between the working surfaces 141 and 143 of pistons 104 and 126, respectively.

As is well known in the art, railroad car bolsters are resiliently supported on compression springs 140 applied in the window opening 142 defined by the truck side frame columns 144.

Thus, it will be seen that since the deflection of the truck springs 140 reflects changes of load weights on the car 10, a relative movement occurs between the truck bolster and the truck side frames that support it, and in accordance with my present invention, this movement is employed to adjust the operation of the metering pin 64 of cushion 18. Assuming that the total load is increased, which increases the weight to be carried by the car trucks, the truck bolsters 127 will be deflected downwardly and move the respective actuator sleeves 116 downwardly with respect to the respective hydraulic pistons 124, of the sensing devices 112. This will move pistons 126 downwardly against the hydraulic liquid that is received in the respective cylinders 124, cylinder 102 and the conduiting 110 and 114, with the result that piston 104 will be moved outwardly of cylinder 102 to effect movement of rack 98 that will turn the connecting rod 92 in the direction of arrow 150 of FIGURE 2. This movement of the rod or member 92 effects movement of tubular member 80 with respect to metering pin member 82 to close off the communication between the exterior or metering pin 64 and its bore 152 in the amount required to suitably increase the resistance of cushion 18 to close when protecting the increased load against coupler impacts.

If the load is lightened, the operation of the sensing devices is reversed and the cushioning arrangement operates to move tubular member 80 so that its ports are more in alignment with the ports of tubular member 82 and thus increasing the area of communication between the exterior or metering pin 64 and its bore 152.

It is here pointed out that a most important aspect of this invention is that the cushion is adjusted in accordance with the load actually on the car while at the same time maintaining and insuring the desired force travel closure characteristic. This necessarily contemplates that sensing arrangement 95 will be properly indexed with respect to metering pin 64 when these components are applied to the car to insure that the setting of the metering pin is for the actual car load conditions reflected by the car truck springs. Thus, when the car is empty, or loadless, truck spring deflection is at a minimum and the cushion metering pin should be set to provide substantially constant force travel cushioning characteristics at zero load conditions. The application of weight to the car up to the maximum load the car can take will then affect adjustment of cushion 18 to provide the desired constant force travel closure characteristic for each load increment involved (under the control of sensing arrangement 95).

The application of springs 118 between the piston rod of the respective sensing devices 112 and their cylinders 124 avoids unwanted adjustment of cushion 18 that would be otherwise occasioned due to sudden deflections in the truck springs as a result of track variations and swaying caused by wind, etc. Thus, as the truck springs 140 deflect under, for instance, track variations, there is no immediate effect on the positioning of pistons 126 within their cylinders 124 because of the resilient connection between the piston rods and actuator sleeves 116. It is only a prolonged displacement of sleeves 116 with respect to their cylinders 124 (it may take several minutes), such as would be occasioned by the application of or the removal of weight to or from the railroad car, that will effect a displacement of pistons 126 to provide a corresponding adjustment of the cushion metering pin, though, of course, the sensing device ports 113 must be appropriately proportioned, or some other liquid flow restriction provided, to insure this effect. It will be clear that devices 112 sense the average truck springs deflection and therefore the cushion resistance will be changed only for car load changes; car body rolling (with respect to its trucks) merely changes devices 112 in a way that does not change the displacement of piston 104.

The piston rod 100 and its rack 98, the hydraulic cylinder 102, and piston 104 of sensing arrangement 95 in effect form a weight summing device for determining the lading weight carried by the car, and the total weight sensed by this device is automatically transmitted to the metering pin 64 of cushion device 18 (that is, the relative truck spring deflection sensed is translated into cushion adjusting movement) by rack 98 through gear 96 and connecting rod or member 92, the latter elements forming a cushion adjuster device 97, which, together with the weight sensing and summing devices, form a cushion adjusting arrangement 153. Body roll makes no net change in the cushion adjustment as the devices 112 on either side of the car automatically compensate for each in dictating the position of piston 104.

In service, the relative positioning, of the hydraulic cushion metering pin tubular members 80 and 82 will be determined by the weight of the load on car 10 as sensed by devices 112 and summed by cylinder 102 and its associated elements, and, as contemplated by this invention, of course, the proportioning and interconnection of parts should be such that the two elements of the metering pin will be disposed as sensed by the sensing arrangement 95, for giving the cushion an approximation of the optimum constant force resistance for any sensed load increment that may be encountered between the maximum and minimum weights to be carried by the car. Of course, the metering pin design must also take into consideration the mass of the car underframe itself and its trucks and the impact speeds that may be encountered in service.

When an impact occurs, for instance, in the direction of the arrow 55 of FIGURE 3, the center sill structure 21 and the stop members 46 fixed thereto move under the impetus of the impact to press one of the stop members 46 against the adjacent end of the hydraulic device 18 to move the latter from its extended position of FIGURE 6 to its contracted position of FIGURE 7. As the hydraulic device moves to its contracted position, hydraulic liquid is forced through the orifices 157 defined by the alignment, or partial alignment, of the ports 84 and 86 of the metering pin tubular members 80 and 82, and somewhat as indicated by the arrows of FIGURES 6 and 9, to dissipate in the form of heat substantially all of the energy that is involved in the so-called "impact effect" when a car impacts against, or is impacted by, one or more other cars. The cushion device 18 also adds to or subtracts from the cushion rack and its container load the energy of the impact that is to be acquired or lost as a result of the impact (depending upon the condition of impact).

Figure 1:
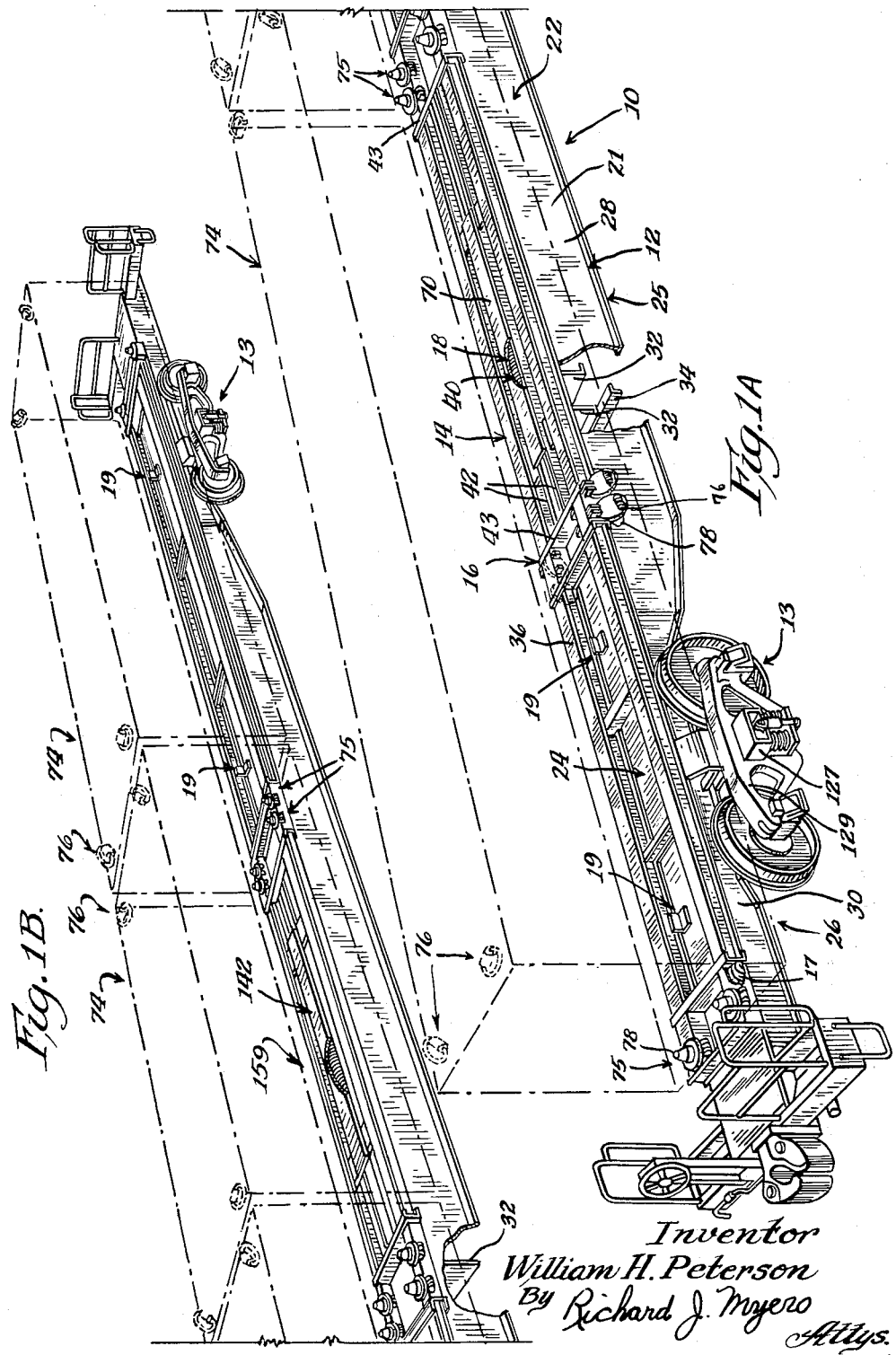

Under the impact condition of FIGURE 3, the impact has been applied to the coupler at the right hand or far end of the car shown in FIGURES 1 (which is keyed to the center sill structure 12 through appropriate draft gear) and this forces the left hand stop member 46 of FIGURE 3 against the hydraulic device closure member 56 forming the follower 60, which presses the device 18 against the right hand pair of lugs 44 (of FIGURE 3). Due to the inertia of the cushion rack or platform 14 and its container load, the absolute motion of the cushion rack and container load is initially unaffected by the impact, but the pressure on the hydraulic device follower 58 acting on the right hand pair of lugs 44 (of FIGURE 3) gradually transfers the kinetic energy of the impact to the cushion rack and its container load. The cushion device continues to close until its parts have the operative relation indicated by FIGURE 7, at which time the cushion rack and its container load have the ultimate velocity dictated by the aforementioned Law of Conservation of Momentum.

After the impetus of an impact has been dissipated and the kinetic energy involved in the impact has been transferred to the cushion rack and its container load through the cushion device 18, springs 62 acting in tandem on closure members 54 and 56 restore the cushion rack and its container load to its normal central position with respect to the car center sill structure 12. In the apparatus of FIGURES 1A and 1B, a booster spring 159 applied to a cushion pocket 161, that is similar to cushion pocket 40, aids in this restoring action, as disclosed in said Gutridge application.

When the direction of impact is in the opposite direction, the functioning of the hydraulic device 18 is the same, though the forces involved act in opposite directions. Draft forces are handled in a similar manner, though the operation of the draft device will depend upon the direction of the draft force, as will be understood by those skilled in the art.

Figure 12:
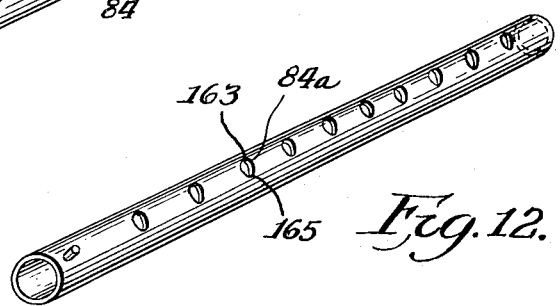
FIGURE 12 is a diagrammatic perspective view of a modified form of internal metering pin component in accordance with this invention.

The showing of FIGURE 12 illustrates a modified form of metering pin port opening for the inner metering pin tubular member 80, in which the ports 84a are elongate transversely of the pin and have a tear drop configuration, such that their larger ends 163 are aligned with ports 86 for light loads, and their smaller ends 165 are aligned with ports 86 for heavy loads.

The showing of FIGURE 13 illustrates the cushion device 18 applied to the cushion body car of my said application Serial No. 25,128 wherein the cushion 18, which is the same as shown in FIGURES 6 and 7, is applied within a cushion pocket 160 defined by the car draft and buffing column 162 which has fixed thereto adjacent the ends thereof bolsters carrying rollers (not shown) on which the car underframe 164 rides. The cushion device 18 in the showing of FIGURE 13 cooperates with lugs 44a fixed within the draft and buffing column 162 and stop members 46a fixed to the body underframe 164 in a manner similar to that already described to cushion coupler impacts, except that the coupler impacts are applied to the column 164 and are then transferred through the cushion device to the underframe 164. The hydraulic metering pin sensing and adjusting arrangement operates in the same manner as previously described.

In the embodiment of FIGURES 14–20, the cushion rack-skeleton car arrangement 500 is essentially the same as that shown in FIGURES 1A and 1B, except that the rack 14a includes a pair of transversely spaced pockets 40, defined by the indicated pairs of channel members 42 that are applied between the unillustrated transverse framing members 43, in each of which a cushion device 18 is mounted.

In this embodiment of the invention, the cushions 18 are adjusted by an all mechanical weight-sensing arrangement 554 for sensing the approximate total average weight of the lading being carried by the car and cushion adjusting device 556 responsive to the total average weight sensed by arrangement 554 for automatically adjusting the metering pins 64 to achieve the desired substantially constant force travel characteristic for the load actually on the car. Arrangements 554 and 556 form cushion adjusting arrangement 153a.

FIGURE 21 illustrates a modified cushion 18a, conforming to the teachings of this invention, as associated with weight sensing arrangement 95 of FIGURES 1–13 for purposes of practicing my invention to provide a modified cushion adjusting arrangement 153b while FIGURE 22 illustrates in connection with cushion 18a manual cushion adjusting arrangement 153c.

FIGURES 23–25 illustrate certain details pertaining to the cushion 18a while FIGURES 26–29 illustrate another manually adjustable embodiment 153d of the invention.

*Specific description*

The skeleton car and container rack arrangement of FIGURES 1A and 1B is merely illustrative of one specific form of apparatus of this type to which my invention is applicable. It will be clear that the invention is equally suited for use on railway car arrangements of the type employing a cushion rack mounted on top of a standard flatcar, such as shown in said Gutridge application as well as in the application of Jack E. Gutridge and Jack W. Borger, Serial No. 36,222, filed June 15, 1960 (the entire disclosure of which is hereby incorporated herein by this reference), and the showing of FIGURES 2–5 may be considered as substantially representing the application of the invention to such cars, since the structural features illustrated would be substantially identical in both cases.

Since standard flatcars and the cushion rack of, for instance, the latter application permit end loading of trailers onto the car piggyback fashion, and attachment of the trailers to the rack for rail transit, it will be apparent that my invention is of considerable benefit in the practice of the piggyback system of handling freight, as well as container systems of the type shown in FIGURES 1A and 1B, since it automatically compensates for variation in load weights of individual semitrailer bodies.

With regard to the cushioned body car arrangement of FIGURE 13, reference may be had to my copending application Serial No. 25,128 for details, as this application discloses the specifics of the car draft and buffing column 162 and the underframe 164. The only modification involved is the use of a stop member 46a that will accommodate the adjustment rod or member 92, and the application of a suitable support for bracket structure 94, such as plate 170 applied between adjacent cross bearers 172. As made clear in my application Serial No. 25,128, the cross bearers 172 define openings through which the draft and buffing column 162 extends.

FIGURE 13 also illustrates that the adjustable cushion aspects of the present invention may be applied to cushion underframe cars since the only real difference between cushion underframe cars and cushion body cars is that the body bolster forms a part of the body underframe 164 in cushion underframe cars, while in the specific car shown in FIGURE 13, the body bolsters are fixed to the draft and buffing column 162.

With regard to the bracket structure 94 that journals the outwardly extending end of adjustment rod or member 92, this device may be of any suitable type, though the form illustrated includes a pair of upright plates 180 fixed, as by welding, to a base plate 182 that may be in turn welded to the top plate 170 of the cushioned body car of FIGURE 13. The rod or member 92 is slidably received in appropriate bearings 184 respectively journalled in the plates 180, and gear 96 is mounted between the respective plates 180. Rod 92 should extend sufficiently beyond bracket structure 94 to accommodate cushion travel in the desired 20–40 inch range.

The stop members 46 and 46a through which connecting rod or member 92 extends preferably journal bearings 183 that actually receive rod 92. The rod or member 92 in each case slidably extends through bearing 183 (which may be of any suitable type), and into the socket 90 of connector element 88, where it is fixed in place in any suitable manner, as by a set screw indicated at 185 (FIGURES 6 and 7).

Cushion 18 should be secured against rotation with respect to cushion pocket 40, and this may be done by making heads or closures square in configuration and proportioning them so that they contact the car deck, or welding lugs together, on either side of the cushion pocket, that will contact the car deck, or in any other suitable manner.

The hydraulic cylinder 102 that actuates rack 98 may secured in place in any suitable manner. In the car of FIGURES 1A and 1B, suitable channel member 103 or other bracket structure applied between the sills 21 of the underframe 12 will serve the purpose. In the embodiment of FIGURE 13, the cylinder 102 may be supported by further brackets applied between the two indicated cross bearer structures 172, or in any other suitable manner as will be apparent to those skilled in the art. When the invention is applied to standard flatcars, cylinder 102 may be secured either to the underframe (so that its rack 100 will project up through the bed of the car), or the cylinder may be applied in a horizontal position between the cushion rack and the car bed, as may be necessary or desirable, though care should be taken to protect cylinder 102 from rough handling.

Conduiting 110 and 114 may take any suitable form and be arranged on the car in any suitable manner. Conduiting 114 is illustrated as being flexible to accommodate the normal movements of the car trucks with respect to the car underframe.

As shown in FIGURE 5, the springs 118 of the sensing device actuator sleeve 116 seat on inwardly extending fingers 186 when the washer structure 120 is in its neutral position. The washer structure 120 is formed with notches 187 to accommodate the fingers 186 so that when the truck springs undergo sudden deflections, the washer structure 120 may move up and down without interference with the fingers 186. The fingers 186 and corresponding washer notches 187 may be for instance, four in number symmetrically arranged about the device 112, though the exact number of these elements employed is optional.

Hydraulic cushion details

The hydraulic cushion 18, which has been generally improved over those forms shown in my applications Serial No. 782,786 and Serial No. 9,785, generally comprises the aforementioned tubular cylinder 48 in which the piston head 50 is reciprocably mounted, the tubular piston rod 52 that is fixed to the piston head 50, a flexible tubular sealing member or boot 190 connected between the tubular cylinder 48 and the tubular piston rod 52, and the helical compression springs 62 that extend between the closure members 54 and 56 and a spring seat 191.

The internal surface 192 of tubular cylinder 48 is formed in any suitable manner as at 193 to receive two snap rings 194 and 195. The snap rings 194 and 195 hold in place a piston rod guide member 196 to which one end 197 of the invaginating boot or tubular member 190 is secured by a suitable clamp 198. The other end of the boot 190 is turned outside in, and is secured to the external surface 199 of the piston rod by a suitable clamp 200.

The device 18 is charged with hydraulic liquid to completely fill the space defined by the tubular cylinder 48, the tubular piston rod 52 and the invaginating boot 190. When the impetus of a coupler impact is applied to the cushion 18, either the tubular cylinder 48 will commence movement to the left of FIGURE 6 or the tubular piston rod 52 will commence movement to the right of FIGURE 6, or possibly both movements may occur. In any event, as the device 18 retracts under the force being cushioned, the metering pin 64 displaces hydraulic liquid contained in the tubular piston rod 52 and the piston head 50 causes hydraulic liquid flow through the orifices 157 of the metering pin into the metering pin bore. As already indicated, the orifices 157 of the metering pin are spaced along the length of the metering pin, and in accordance with this invention they are respectively proportioned so that (assuming the mated pairs of ports 84 and 86 to be in some position of alignment) they provide a constant force travel characteristic over a specific range of car load conditions (in which the relative alignment of ports 84 and 86 is related to or calibrated with respect to the possible load variation conditions of the car), as the hydraulic cushion contracts under the shock imposed upon it. This may be done by spacing the mated ports 84 and 86 so that metering pin orifices 157 of equal areas along the length of the metering pin have the necessary spacing to achieve the desired cushion force-travel characteristic, or by providing equal spaced mated ports 84 and 86 with such area relations longitudinally of the pin that the resulting equally spaced orifices 157 will have the relative areas that will achieve this end, or by employing a combination of these relationships, and, of courst, appropriately relating the angular positioning of tubular member 80 with respect to member 82 in relation to the possible load variations of the car.

As is best shown in FIGURE 6, the oil flow, when initiated by contraction of the cushion, is from chamber 202 on the high pressure side of the piston head 50 through the individual orifices 157 defined by the metering pin tubular members 80 and 82 into the bore 152 of the metering pin, thence outwardly of the metering pin bore into the bore 203 of the piston rod 52 and then radially outwardly of the piston rod 52 through orifices or ports 204. As the hydraulic liquid within the tubular piston rod is displaced by the metering pin, it likewise moves through piston rod ports 204, as indicated by the arrows.

The hydraulic liquid flow through the ports 204 is under relatively high velocity and creates great turbulence in the chamber 205 that is formed by the space between the tubular piston rod guide member 196 and the piston head 50. This great turbulence is caused at least in part by the radially directed flow of hydraulic liquid impinging directly against the inner surfare 192 of tubular cylinder 48, and is responsible for dissipation of much of the kinetic energy of the impact in the form of heat by reason of the fact that maximum heat is generated in the hydraulic liquid, and the heated hydraulic liquid flow is directed against a constantly changing portion of the cylinder wall surfaces 192 (which uniformly distributes the heat along tht cushion).

As contraction of the cushion device 18 proceeds, the high pressure chamber 202 is reduced in volume by the advancement of the piston head 50 toward the tubular cylinder closure member 54. The hydraulic liquid passing through the metering pin orifices 157 fills the chamber 205 behind the piston head 50, while a volume of hydraulic liquid equivalent to that displaced by the total entry in the fluid chamber defined by the bore of the piston rod passes through apertures 208 of guide member 196 into the space 210 enclosed by the boot or tubular member 190, which inflates or expands and rolls to the position suggested by FIGURE 7. The apertures 208 of guide member 196 are relatively large in cross-sectional area, which provides for thence a relatively large volume and consequently low pressure hydraulic liquid flow from the chamber 205 to space 210. This avoids generation of any appreciable compressive force on the relatively slender metering pin and prevents any possibility of it buckling.

As the device 18 closes in dissipating shock, a small portion of the energy of the impact is stored as potential energy in the compression springs 62. As the inner end 212 of the metering pin approaches its innermost position within the tubular piston rod, liquid flow from the piston rod moves outwardly from its bore through ports or orifices 214 that communicate directly with the space 210 that is defined by the boot 190. Since the space between the internal surface 203 of the piston rod and the metering pin is relatively small (see FIGURE 9), the flow path back to ports 204 becomes more and more circuitous as the metering pin advances within the piston rod bore. Ports 214 thus avoid pressure buildups within the piston rod bore which would make the cushion highly sensitive to hydraulic liquid viscosity variations.

After the impetus of the shock has been dissipated, the springs 62, acting in tandem, return the hydraulic cushion components to the initial extended position of FIGURES 6 and 9, this action expending the portion of the energy occasioned by the impact that is stored in the return springs. During this extension movement under the action of the compression springs, the oil flow illustrated in FIGURES 6–9 is reversed and the tubular steel or boot 190 contracts to the position of FIGURE 6, thereby insuring that the hydraulic liquid displaced by the piston rod 52 and metering pin 64 is restored to its normal operative locations.

In this embodiment of the invention, the piston rod 52 has stop lug or ring 220 applied about the circumference thereof at a location that is to define the maximum extended position of the cushion. The piston rod guide 196 and the ring 220 are biased against each other by the return springs 62 to prevent further extension of the cushion.

The ring 220 is provided with an external diameter that avoids sealing off of piston rod guide passages 208 (see FIGURE 9). Alternately, ring 220 may be replaced by spaced lugs positioned about the periphery of the piston rod and between piston rod guide passages 208 in such a manner as to avoid interference with the ports or passages 208, but tests have shown that this is not necessary.

In the illustrated hydraulic cushion, the external diameter of the metering pin and the diameter of the piston head orifice 66 are made substantially identical, without resorting to fine tolerances, so that there will be a smooth sliding contact between the two. This eliminates the problem of metering pin vibration during cushioning of impacts.

My studies have shown that metering pin vibration is caused primarily by slight misalignments of the pin with respect to other axial center of the piston rod orifice through which it is to extentd. Manufacturing tolerances make it difficult to precisely center the metering pin with respect to a piston head orifice 66, and where oil flow is to take place between the pin and portion of the pinion head defining the orifice, the metering pin is deflected if it is the slightest bit off center with regard to the piston head orifice. Under severe impacts, the vibration becomes excessive as it builds up in a manner similar to the cumulative effect of a group of soldiers marching on a bridge, and tends to enlarge the orifice 52 by engagement of the vibrating metering pin with the piston head.

Since the cushion of FIGURES 6–9 provides for a guiding action on the metering pin by the very orifice defining structure through which it extends, and hydraulic liquid flow is through the bore of the metering pin rather than between the metering pin and the piston head, the causes of metering pin vibration are completely removed.

*Specific description of cushion device elements*

The tubular member or cylinder 48 may be formed from any suitable material such as cold drawn seamless A.I.S.I. 1015–1018 or 1020–1025 (about 1022 is preferred) steel tubing having a minimum yield point of 70,000 p.s.i., the recesses 193 being formed in any suitable manner, such as by lathe cutting in the internal surface 192. Internal surface 192 between the inner recess 193 and closure 54 need only be sufficiently smooth to permit efficient operation of piston head 50, and the smoothness may be, and preferably is, comparable with that ordinarily obtainable by drawing tubing over a polished mandrel. In the embodiment illustrated, the tubular member or cylinder 48 comprises tube 270 welded as at 272 to closure plate or member 54. Snap rings 194 and 195 are Truarc carbon spring steel internal snap rings.

The closure plate or member 54 of cylinder 48 is provided with an improved check valve assembly generally indicated at 274 (see FIGURE 8) through which the hydraulic liquid passes when the device 18 is charged.

The check valve assembly 274 illustrated includes a stepped diameter bore 275 formed in closure 54, and threaded as at 277, for receiving set screws 279 and 280, each formed with a hex-shaped recess 281 formed to receive a suitable turning tool.

Mounted within the bore 275 is a compression spring 276 acting between annular seat 273 and ball 278 to press ball 278 against valve seat 283 about inlet passage 282 of screw 279. Seat 273 is the inner end of bore 275 and orifice 285 provides communication between bore 275 and the interior of cylinder 48.

Screw 280 may be turned against a copper washer 284 applied between screws 280 and 279 to insure that an adequate sealing action is provided.

The spacing of snap rings 194 and 195, and thus their recesses 193 formed in tube 270, and the abutment forming ring 220 of the tubular piston rod must be such that the piston rod ports 204 remain uncovered at all times.

The tube or sleeves 80 and 82 forming metering pin 74 are preferably formed from cold drawn 1020 steel tubing. These elements preferably are applied to closure plate or member 54 as by member 82 being threaded into recess 287 formed in nut 288 that is threaded into the axial center of closure 54, with the connector 88, to which tube or sleeve 80 is fixed being rotatably mounted in bore 290 of said nut 288. Nut 288 may be turned against copper ring 291 and connector 88 may be provided with gasketing 292, for sealing purposes. Connector 88 is welded to tube 80 as at 293 and pin 294 fixed to tube 80 and extending through slot 295 limit relative rotational and longitudinal movement of tubes 80 and 82.

As previously indicated, the metering pin orifices 157 as a whole should provide a composite or total orifice area arrangement or programming longitudinally of pin 64 that, when the cushion is appropriately adjusted in accordance with the load on the car, achieves the desired substantially constant force travel characteristic on closure. The needed spacing and size of orifices 157 may be obtained by first calculating the needed orifice area variations per unit of travel using the relationship $$A_x = A_0\sqrt{1-x/d}$$

wherein $A_x$ is the sum of the orifice areas not yet closed off by piston head 50 at any position $x$ (see FIGURE 6) over the total nominal stroke $d$ (the length between points 300 and 302) and $A_0$ is the initial composite orifice area defined by all of the orifices 157 at the beginning of the stroke, in the case where a completely rigid body is being cushioned from impact. Taking the orifice area range provided by this relationship, it is then a simple design operation to select the orifice opening 157, sizes and spacings necessary to reasonably approach the results suggested by the theoretical relationship mentioned for the particular car load conditions to be protected, keeping in mind the maximum and minimum masses to be protected and impact speeds and conditions to be encountered, and then to select the opening sizes of mated ports 84 and 86 as they are to be related to provide the indicated sizes of orifices 157 for the range of car load conditions to be protected (as controlled by the adjustment feature of this invention). In the illustrated embodiments, the sets of metering pin orifices of the respective members 80 and 82 are made the same size for convenience in drilling, and thus the spacing between these orifices must be varied to achieve the desired relationship. The location of each orifice 157 may be conveniently found by plotting the curve 303 of the above relationship, as in FIGURE 9a, for the stroke and orifice area conditions decided upon, and then adjusting the position of each orifice 157 to approximate this ideal curve (a large number of orifices gives a closer approximation).

While the circular shape of ports 84 and 86 will provide reasonably satisfactory results, the embodiment of FIGURE 12 is preferred as the curve of the sides of the tear drop ports 84a can be made to provide (with ports 86 of metering pin outer member 82) an orifice area change rate (in accommodating varying car loads) that more closely approximates the linear spring deflection rate of truck springs 140. Actually, the shape of ports 84, 84a and 86 is not so important as the orifice area change rate provided by relative movement of the movable metering pin member 80, and for best results, this area change should approximate the deflection rate of trucks 140 (as the relative movement between the car underframe and the truck frames is what is employed to automatically adjust the cushion 18, in accordance with this invention).

Furthermore, cushion 18 may be of the manually adjustable type and for this arrangement, in the showing of FIGURE 2, the sensing arrangement would be eliminated and rod 92 be provided with a suitable mark to cooperate with a scale (similar to that of FIGURE 22) which could indicate settings of the cushion for full, three-quarter, one-half and one-quarter loads with rod 92 being turned as required by employing an appropriate hand tool. In such an arrangement, the embodiment of FIGURE 12 could be employed on or alternately, the inner metering pin member 80 could be formed with a plurality of rows of round ports 84, with the ports of each row being equal in size but proportioned to provide a substantially constant force travel cushioning action appropriate for one of the load conditions mentioned above. This should actually give adequate cushion adjustment for load variations that would be encountered in practice.

It will be observed from FIGURE 7 that the metering pin member 64 between point 301 and the closure member or plate 22 is thus left with a cylindrical surface portion 310 that is unperforated. The arrangement is therefore such that the metering pin orifices 157 end before the piston head 50 contacts closure plate or member 54. Since the surface portion 310 substantially closes the piston head orifice 66, some hydraulic liquid will tend to be trapped between the piston head and closure plate 54, except for leakage flow between the piston head and cylinder wall. In the specific embodiment of the invention illustrated, the piston head is spaced on the order of 1 inch from the closure plate or member 22 when orifice 66 is closed by surface portion 310, giving stroke $d$ a length of 29 inches, as it is desired that device 10 have a nominal stroke of 30 inches. This compensates for inevitable leakage and prevents the cushion from bottoming at the higher impact speeds.

The tubular cylinder 48 and piston rod 52 are preferably proportioned in relative lengths to permit the piston head to move the full length of cylinder surface portion 310, should this movement be necessary.

The closure plate or member 54 may be formed from A.I.S.I. 1015–1018 open hearth (or mild) steel plate which has compositional characteristics compatible with the cold drawn steel used in the cylinder 48, simplifying the choice of weld material for insuring a sound weld.

Piston head 50 preferably is formed from a material that is dissimilar from that of cylinder 48, for instance, bronze or some other material of suitable structure characteristics. In the illustrated embodiment, piston head 50 comprises a disc-like body 320 (see FIGURE 9) that is heat treated for hardness after the necessary machining has been done, so as to be formed with planar forward face 322 and planar rearward face 324 separated by an annular guiding surface, orifice 66, threaded counterbore 325, and piston ring groove 326. The piston head 50 screw threadedly receives the inner end 330 of piston rod 52.

The rim or surface 328 of piston head 50 that defines orifice 66 should have a diameter giving a tolerance spacing or clearance between the piston head and the cylindrical surface 329 of metering pin 24 that is about the same as that between the piston head and the internal surface 192 of cylinder 48 so that the metering pin will not be stressed by lateral movements of the piston head during operation. In a specific embodiment of this invention, the tolerance is on the order of .017 inch.

The piston head 50 in the larger size cushions preferably is formed with a groove 326 that receives a conventional type piston ring 338, in order to prevent excessive leakage past the piston. This is not necessary in smaller diameter cushions as the tubing tolerances resulting from cold drawing tend to be sufficiently close to provide the degree of sealing action desired.

Tubular piston rod 52, which may be formed by being cold drawn from A.I.S.I. 4130 chrome-molybdenum steel and, after all machining is completed, heat treated to the desired yield strength, in the illustrated embodiment is in the form of tube 339 having ports 204 and 214 formed therein in any suitable manner. The ports 204 and 214 are round in configuration in the illustrated embodiment and should be numerically sufficient to insure unrestricted liquid flow, while consistent with keeping the piston rod of sufficient cross section at these ports to resist the compressive forces developed in the piston rod.

The closure 56 may be formed from open hearth mild steel plate such as A.I.S.I. 1015–1018, and affixed to the tube 339 in the manner suggested by FIGURES 6 and 7. As indicated, plug 342 (which preferably is formed from the same material as piston rod 16) may be welded as at 340 within tube 339 and closure 56 fixed to plug 342 by an appropriate bolt 349.

It is important that a complete, high strength weld, hydraulic seal be effected at the weld between the cylinder 48 and closure member 54, between closure member 54 and metering pin 64, and at the weld between plug 342 and piston rod 52. For the materials specified above, an E–16 low hydrogen high strength electrode or its equivalent should be used for fixing the closure member 54 to cylinder 48 and plug 342 to piston rod 52; the tube 80 of pin 64 may be welded to connector 88 of head 54 by employing any electrode customarily used on open hearth mild steel from which connector 88 is formed, such as an E–12. These welding materials for the specific device herein described provide a homogeneous high strength union with a complete seal type weld.

The tubular piston rod guide member 196 preferably is formed from a material that is dissimilar from that of piston rod 52, such as bronze or some other material of suitable characteristics, and comprises a hub-like element 350 (see FIGURE 9) including a flange portion 352 that is received between snap rings 194 and 195 of cylinder 48, and annular shoulder 354 to which the end 197 of the tubular seal 190 is secured. As indicated in FIGURE 9, the apertures 208 of guide member 196 are relatively large and preferably are more or less equally distributed about this member. The hub-like member 350 may be formed with an appropriate recess 360 to receive a conventional O-ring seal 362.

The abutment ring 220 may be formed from any suitable material and is welded to the external surface 199 of the tubular piston rod as at 363.

While the tubular seal or boot 190 may be formed from any conventional substance that will resist the particular hydraulic liquid employed in unit 10, the compatibility of the material forming the seal 190 and the hydraulic liquid is of utmost importance. Considerable experience and experimentation in this art have revealed that the hydraulic liquid employed should be in liquid form at ordinary temperatures and have a viscosity that does not fall outside the range of 45 Saybolt Universal seconds at +130 degrees F. and 200 Saybolt Universal seconds at −30 degrees F. Furthermore, it should have anti-galling and lubricating characteristics to overcome any tendencies of the piston head to gall or cold weld to the walls of cylinder 48, due to tolerance variations and minor misalignments when installations are made. A preferred hydraulic liquid-tubular seal material combination that I have found effective is the SAE specification 70R2 isobutyl alcohol (which is commonly used in automobile brakes, and is provided with a synthetic lubricant additive in the form of a polyalkaline glycol in an amount of 25 percent by volume) including a special anti-galling additive of about 0.5 percent by volume of Dag dispersion No. 210, made by Atcheson Colloids Co. of Port Huron, Michigan, which is a colloidal suspension of graphite, with the boot being formed from natural rubber base compound 9283 (having a diameter in the range of 50–60) made by B. F. Goodrich Chemical Company of Akron, Ohio, or Trampolin rubber made by the same company. The graphite tends to form a film on the walls of the cylinder 48 that overcome cold welding tendencies. Galling is further resisted by the dissimilarity of the piston head 50 and the member it slidably contacts (cylinder 48) and the piston rod guide 196 and the member it slidably contacts (piston rod 52).

Any material that is to be used for the boot should have a good tear resistance in any direction, no permanent set, low temperature flexibility, and resistance to attack by industrial atmospheres. Where the hydraulic liquid indicated is used, the material should be a natural rubber base compound.

The clamps 198 and 200 may be of any suitable type, though the form of clamps sold under the trademark "Punch-Lok" is preferred as it lies substantially flush against the surface of the seal or boot 190. These clamps are available from the Punch-Lok Company of Chicago, Illinois, and as shown in FIGURE 10, comprise a stiff metallic strip 400 having one of its ends hooked as at 402 to engage one edge 404 of looped band member 406, the strip being wound on itself several times through said band member. In this condition, it is applied to one end of seal or boot 190, after which the free end of the strip 400 is pulled to tighten the band around boot and then is bent over the other edge 405 of the band member 406 and is trimmed off, as indicated at 408. The band member 406 and the passes of strip 400 passing through it are locked together as by forming indentation 410, after the strip has been pulled tight about boot 190, and before the free end of the strip is trimmed off.

The compression springs 62 may be formed from A.I.S.I. C–1095 spring steel, heat treated, or any other suitable substance that will serve the purpose, and may be in the form of a single unit or two compression springs acting in tandem, though in the latter case the spring extending over tubular piston rod 52 should be of sufficient length to engage over the end of tubular cylinder 48 when the device 10 is in its extended position. The springs when applied to cushion 18 should have a preload force on the order of 7500 pounds when used in a sliding sill underframe, and provide a return spring force in the range of between 10,000–20,000 pounds in the contracted position of the cushion.

The unit 18 should be designated for the maximum impact and energy absorption requirements of any cushioning system in which the device is to be incorporated will be subjected to. Thus, the unit should be designed so that when the metering pin surface portion 310 closes piston orifice 66, the device will have absorbed the maximum impact that can be applied to the cushioning system.

In a specific embodiment of the cushion that is specially adapted for use in cushion underframe cars, the illustrated components are proportioned to provide an extended length of 96 inches (at which position abutment ring segments 220 bear against piston rod guide member 196) and a compressed of maximum retracted length of 66 inches (at which position the piston head 50 is spaced ¼ inch from closure plate or member 54 and orifice 66 is closed by metering pin surface portion 310). This specific unit has a maximum outside diameter of 8½ inches as measured by the flanges 420 of the closure members 54 and 56 and the cylinder 12 has a 6½ inch diameter bore within a mill tolerance of 0.017 inch. Piston rod 52 has an external diameter of 3½ inches and an internal diameter of 3 inches, both within a tolerance of 0.018 inch, and piston head 50 is 2 inches in thickness, with its opening 66 being 2½ inches within a tolerance of 0.002 inch. In the illustrated embodiments, the springs 62 comprise two spring units acting in tandem against the flanges 420 of said closure members and abutting against annular seat 191 at the midpoint of the unit; each spring 62 is coiled from a spring steel bar approximately 50 feet in length. The maximum outside diameter of this specific embodiment is dimensioned to fit within the confines of a cushion underframe draft and buffing column having the standard Z–26 section. A unit 18 for use in the arrangement of FIGURES 1–5 may be sealed down proportionately and dimensioned to fit between members 42 of rack 14.

After the unit 18 have been assembled except for application of the check valve assembly 74, the unit may be charged by standing it upright so that closure member or plate 54 is uppermost and then filling the device with hydraulic liquid through the bore 275. The check valve assembly elements 276, 278 and 279 are applied in the positions indicated after which further hydraulic liquid is applied to the unit through the set screw 279 to sufficiently inflate the seal 190 to space it from cylinder 48. After working the cylinder 48 up and down a few times, any entrapped air will rise to the check valve where it may be bled out. Then an additional charge of hydraulic liquid is introduced through the check valve to make up for the air volume that has been bled from the unit, and to sufficiently inflate the seal so that it will not rub or be rubbed by the internal surface of the cylinder 48, after which seal washer 284 and set screw 280 are applied to seal off the check valve assembly.

The hydraulic liquid when the device is in fully extended position is under very little pressure, perhaps no more than 5 p.s.i., but even though the pressures in the high compression chamber 20 may rise to as much as 8,000 p.s.i., the maximum pressure acting on the seal or boot 190 (when the seal is in the extended position of FIGURE 7) is believed to be about 12 p.s.i.

Units 18 can be designed for operating pressures of up to the limit of the yield strength of cylinder 48, and the device illustrated when employed in the railroad car structures herein described is capable of absorbing kinetic energy on the order of one million foot pounds, depending, of course, on the specific design required for a specific purpose. Units 18 will thus easily absorb 15 m.p.h. impacts when applied to, for instance, a railroad car of the type shown in FIGURES 1A and 1B by a standard car, with each weighing 210,000 pounds each. Impacts as high as 17 m.p.h. have been made between a standard car and a cushion underframe car of the type contemplated by my application Serial No. 856,963 of this weight with no failure.

Specific description of modified forms of invention

The weight-sensing arrangement 554 (see FIGURES 14–20) includes rods 557 and 558 located on opposite sides of the center sill 12 and each is turnably supported in brackets 559 fixed in any suitable manner to the respective underframe sides. The rod 557 extends toward one end of the car and a feeler plate 560 affixed thereto engages the upper surface 131 of the truck frame 129 of the truck 13 at that end of the car. The rod 558 extends toward the other end of the car on the opposite side thereof and a feeler plate 561 fixed thereto engages the top of the truck frame 129 that is diagonally opposite that shown in FIGURE 19 (see FIGURE 14). Rods 557 and 558 are connected across the car by the hereinafter described linkage in such a manner that in the lightest possible load condition of the car, feeler plates 560 and 561 will bear against their respective truck frames. The weight of rack 14 together with the container 74 that it may carry, or be carrying, will cause the truck or bolster springs 140, at both ends of the car, to deflect an amount corresponding to the weight carried by the trucks. Such deflection of the truck springs causes a corresponding deflection in the respective feeler plates 560 and 561 which turns the respective rods 557 and 558 through angles corresponding to the load carried by bolsters 127; and, changes in weight on the car likewise cause similar relative movement of rods 557 and 558 as dictated by the relative deflection of the truck springs 140. Hence the degree of angular turning of the rod 557 measures the total weight in the vicinity of one end of the car and the degree of angular turning of the rod 558 measures the weight in the vicinity of the other end of the car. At the same time, the orientation of the feeler plates 560 and 561 diagonally of the car serves to cancel out any weight-sensing discrepancy that might otherwise be caused by car roll, since roll in deflecting one feeler plate will release the other by a corresponding amount.

In order to keep feeler plates 560 and 561 in engagement with the respective truck frames under all load conditions, at least one of the brackets 559 of each rod 557 and 558 is provided with a resilient bushing device 521 (see FIGURE 14A) through which the respective rods 557 and 558 extend. Devices 521 each comprise a rubber sleeve 523 bonded to inner and outer sleeves 525 and 527. The inner sleeve is keyed to a rod 557 or 558 by cotter pin 529, and outer sleeve 527 is made fast to the respective brackets 559 as by set screws 531, when the cushion device is indexed with respect to the truck (preferably under no load conditions).

To sum up the weights measured or sensed at the ends of the car, links 562 and 563 are keyed or fixedly connected to the respective rods 557 and 558, for turning movement therewith, and pivotally connected to the respective links 562 and 563 are parallel drive bars 564 and 565 that extend transversely of the car. The drive bar 564 comprises a projection or strap 566 that is pivotally connected at its projecting end by a pin 567 to link 562, and a channel member 568 that is fixed as by welding to the other end of the strap 566. The drive bar 565 includes a rod or arm 569, pivotally connected at one end to the link 563 by way of a pin 570, and fixedly connected to the other end of the member 569, as by welding, is a casing 571 of a resilient shock-absorbing device 572 also forming a part of drive bar 565.

The shock-absorbing device 572 (see FIGURE 17) has disposed in its casing 571 a piston 573 which is opposingly subject to prestressed coil springs 574 and 575. Connected to the piston 573 is a piston rod 576 which extends through the casing 571 and is fixedly connected in any suitable manner to a channel member 577. The springs 574 and 575 are operative to transmit movement of the rod 569 to the channel 577 under normal operating conditions, during which truck springs are periodically deflected due to uneven track conditions and the like. However, in the event of extreme jolts causing a severe deflection of the springs 140, the rod 569 and the channel member 577 telescope relatively to each other because the springs 574 and 575 yield. For example, under normal track conditions during transit, the truck springs 140 under normal load conditions deflect a predictable maximum amplitude, and the prestressed springs 574 and 575 are selected so as to be capable of directly and completely transmitting movement of the rod 569 to member 577. However, should an abnormal uneven track condition be encountered, such that the predictable maximum amplitude of spring deflection (of springs 140) is exceeded, the springs 574 and 575 compress relatively to each other so as to permit the piston rod 576 and the casing 571 to telescope. In this manner, sever stresses on the linkages are eliminated.

Connecting the channel 577 of the drive bar 65 to the channel 568 of the drive bar 64 is a dampening device 578 which serves to preclude relative movement between the drive bars 564 and 565 during normal periodic truck spring deflections encountered during transit. As shown in FIGURES 15–17 and 20, the pulse-dampening device comprises a hydraulic double-acting cylinder 579, including a piston 581 (see FIGURE 20), having a piston rod 582 extending through both ends thereof (to insure an equal volume of liquid on each side of the piston 581 at any displacement) and pivotally connected at one of its ends by pins 582a to suitable bracket 564a of the drive bar 564. Cylinder 579 is fixed to drive bar 565 in any suitable manner, as by attaching bracket plates 579a (that are fixed to the cylinder 579) to bracket plate 583 (as by employing bolts 577a) that is fixed, as by welding, to channel member 577.

Piston 581 thus defines in cylinder 579 chambers 584 and 586 which are connected by a conduit 587, having a restricted orifice opening 588. The space defined by cylinder 579 and conduit 87 are filled with a suitable hydraulic liquid.

The restricted orifice 588, in operation of device 578, serves to retard the rate of flow between the chambers 584 and 586 such that momentary pulsations caused by in-transit truck spring deflection are not of sufficient duration to vary the displacement of the piston 581. In this manner, pulsating deflections of the truck springs 140 are not effective to significantly vary the position of the piston 581 relative to the cylinder 579, so that under such conditions, the drive bars 564 and 565 remain stationary with respect to each other. However, should the deflection on the truck springs 140 be applied for a prolonged period, as when the weight of the lading on the car is changed, an unbalanced force (generated by the tendency of either or both drive bars 564 and 565 to move relative to the car or to each other under the deflecting action of feeler plates 560 and 561) is applied to piston 581 causing a hydraulic liquid flow through the restricted orifice 588 to permit relative movement of the piston 581 within the cylinder 579 and thereby accommodating the indicated change in the relative positions of the drive bars 64 and 65. This relative movement continues until the opposing forces of the hydraulic pressure on the piston 81 are again in equilibrium as dictated by the amount of deflection of feeler plates 560 and 561 from their previous positions, and the piston 581 will remain in this position until a further change in lading weight is made.

Obviously, the direction that piston 581 moves with respect to cylinder 579 will depend on whether the load on the car is lightened or increased. And, of course, the strength of springs 574 and 575 should be such as to transmit between drive bar 565 and its rod 558, without material deflection, the thrust that is provided by the action of feeler plate 561 and overcome any frictional forces incident to operating the drive levers.

Affixed to the channel 568 of the drive bar 564 is a rectangular housing 589 formed by upper and lower horizontal plates 591 and 592 (see FIGURE 18) fixedly attached in any suitable manner, as by welding, along like ends of each to the respective legs or flanges of the channel 568. A vertical plate 593 connects the other ends of the horizontal plates 592 and 591. The housing 589 receives the channel 577 and thus the drive bar 565 for reciprocating movement therein and may be provided with guide strips 594 for guiding the relative movements involved. For facilitating relative movement of the channel 577 within the housing 589, there may be provided slide strip 596 formed of a suitable antifriction substance, such as a TFE fluocarbon resin made and sold by E. I. du Pont de Nemours & Co. under the trademark Teflon, or the like. Turnably or rotatably supported by the upper and lower plates 591 and 592 is a shaft 597 to which gear 598 is fixedly secured in any suitable manner, as by a suitable keying arrangement. The gear 598 meshes with a rack 599 fixed along the web of channel 577 of the drive bar 565.

As heretofore described, the position or degree of angular turning of the rod 557 about its longitudinal axis (from some predetermined initial position) corresponds to the weight carried adjacent the feeler plate 560 end of the car, and the degree of angular turning of the rod 58 about its longitudinal axis (from some predetermined initial position) reflects the weight of the lading adjacent the feeler plate 561 end of the car.

A change in the indicated angular position of the rod 557 (resulting from adding to or subtracting from the lading at the feeler plate 560 end of the car) causes the drive bar 564 to be displaced relatively to the car underframe 12 and drive bar 565. Such relative displacement of the bar 564 causes the gear 598 to be rotated with respect to underframe 12 an amount corresponding to the change in angular position of the rod 557 and thereby corresponding to the change in weight carried by the feeler plate 560 end of the car. This change in position of the gear 598 causes the shaft 597 to which the gear 598 is fixed to be turned a corresponding amount.

Similarly, the degree of angular turning of the rod 558 corresponding to a weight change experienced by the feeler plate 61 end of the car is reflected in a linear movement of the drive bar 565 transversely of the car. Such linear movement of the drive bar 565 causes the rack 599 meshing with the gear 598 to turn the latter and thereby turn the shaft 597 an amount corresponding to the change in weight on the feeler plate 561 end of the car.

It is evident, therefore, that the degree of angular turning of the shaft 597 with respect to underframe 12 (and from a predetermined "zero" position) which may be caused by individual or collective movements of drive bars 564 and 565 with respect to each other corresponds to the weight at both ends of the car and thus the shaft 597 is more or less in the nature of a summing device for determining the entire weight carried thereon.

The weight changes sensed by the amount of angular turning of the shaft 597 are then automatically transmitted to the metering pin structure of the cushioning devices 18 by way of a cushion adjusting means 556. The cushion adjusting means 556 includes a flexible connector 601 connected at its lower end by way of a pin 602 for movement with the shaft 597 and connected at its upper end by way of a pin 603 to a shaft 604 (see FIGURE 18) which is loosely journaled in a bracket 605 fixed on the underside of the underframe 12. Fixed to the end of the shaft 604 protruding beyond the bracket 605 is a link 606. The link 606 is fixed to the shaft 604, and accordingly rotates under the rotating action of shaft 597 and the flexible connector 601; at one end link 606 is provided with a slot 607 which accommodates a pin 608 fixed to a bracket 609 that is carried by cross arm 610 intermediate the ends thereof. Connected to the respective ends of the cross arm 610, as by a pin and slot connection 611, are the lower ends of links 612, the upper ends of which are slidably received over the actuator rods 92 for controlling the relative positions of the inner and outer tubes 80 and 82 of metering pins 64, as heretofore described. Supporting the rods 92 for sliding movement relative to the underframe 12 are brackets 613.

Upon relative turning of the shaft 597 indicating and corresponding to any change in the weight carried by the car as dictated by corresponding relative movement between drive arms 564 and 565, the necessary change in the cushion adjusting means 556 is effected by the corresponding turning of the flexible connector 601 which, in turn, swings the link 606 through an angle corresponding to the change in weight sensed to rotate the actuator rods 92 by way of the links 612 connected to their respective ends. In this manner, the relative positions of the ports 84 and 86 in the inner and outer tubular members 80 and 82, respectively are varied so as to provide substantially constant force travel cushioning conditions for the particular load condition of the car.

When assembling cushion adjusting arrangement 153a, the illustrated components thereof are first applied substantially as shown to the car 500 (in its unloaded condition) without link 606 being fixed to shaft 604. The feeler plates 560 and 561 are then placed in physical contact with the tops of the respective truck frames, and this indexes the length of the linkage of which feeler plates 560 and 561 form a part to the lightest load condition of the car, and the metering pins 64 should then be disposed at the position desired for adequately cushioning zero load conditions. The link 606 is then made fast to shaft 104 and set screws 531 moved to fix sleeves 527 of resilient bushing devices 521 with respect to the respective brackets 559, with the result that feeler plates 560 and 561 will remain in contact with the indicated truck frames for all operating load conditions of the car due to the biasing action of devices 521.

Upon impact at either coupler carried on each end of the underframe 12, the cushioning devices 18 are operative to protect the lading in the manner previously described, except that the two cushions 18 of this embodiment of the invention act simultaneously in parallel relation. Changes in the lading carried by the car changes the length of the linkage connecting feelers 560 and 561, which rotates shaft 597 a corresponding amount and then sets the cushions 18 at the metering pin condition which will provide substantially constant force-travel cushioning for the load then on the car.

It is important to note that rolling of the car body (with respect to its trucks) will not change the adjustment of the cushions 18 as such roll in deflecting one feeler plate will release the other so that no change in the effective length of the linkage interconnecting them will result. During this rolling action, drive arms 564 and 565 merely sway back and forth transversely of the car without moving with respect to each other.

The adjusting structure of FIGURES 14-20 is primarily mechanical in nature and does not rely upon hydraulic or other type of devices to obtain the desired adjusting. This is advantageous from the point of view that the various parts of the linkage will stay in the same operative relation, after installation unless they are bent or otherwise disturbed. Thus, the only minimum inspection is required to assure continuous proper operation.

Turning now to the embodiments of FIGURES 21-25, these embodiments are directly applicable to the car 10 in place of the cushioning arrangement of FIGURES 1-12.

In FIGURE 21, the showing pertaining to the self-adjusting cushion arrangement is similar to that of FIGURE 2 except that the modified cushioning device 18a is applied to the rack 14 in association with a modified cushion pocket 40a.

The cushion pocket 40a is defined by the previously described longitudinally extending frame members 42 that form a part of the rack 14 and transversely extending abutment members 650 which are rigidly fixed between the respective framing members 42 (as by welding) and braced by appropriate webs 652.

In the cushion pocket 40a, the rack lugs 44 and the car stops 46 as such are eliminated and the cushioning device is applied within the cushion pocket 40a between abutment plates 650 and fixed with respect to the top plate structure 24 of the car underframe 12 in any suitable manner.

The cushioning device 18a (see FIGURE 23) generally comprises a housing 660 that in the illustrated form is generally parallelepiped in configuration, and is made fast with respect to the car underframe 12 by applying it between spaced stops 662 that are fixed to the top plate structure 24 of the underframe 12 in a manner to receive the opposite ends 664 of the housing 18a.

Reciprocably mounted within the housing 660 is an operating rod 666 having affixed thereto in any suitable manner a piston head 668 which reciprocates within a hydraulic cylinder 670 that is positioned within housing 660. The operating rod at each end 672 thereof extends outwardly of the housing through sealed openings 674, and the respective ends 672 of the operating rod terminate in flanged portions 676 that abut the respective abutment plates 650. Interposed between the respective operating rod flange portions 676 and the housing ends 664 are the respective compression springs 678 that serve to restore the cushion 18a to neutral position after an impact has been occasioned and dissipated.

In accordance with this embodiment of the invention, the operating rod 666 and the cylinder 670 are proportioned to provide a cushion travel of the same character as cushion device 18.

Furthermore, the cylinder 670 is formed with a plurality of orifices 680 that are arranged lengthwise of the cylinder in the same manner that ports 86 are arranged along the fixed tubular member 82 that forms a part of the metering pin 64 of cushion device 18.

In other words, the orifices or openings 680 on either side of the mid portion 682 of cylinder 670, and between said mid portion 682 and the ends of the cylinder, are either spaced or proportioned in accordance with the realtionship previously described in connection with the positioning of the metering pin orifices 157 of cushion device 18, so as to provide a substantially constant force travel closure characteristic under zero or minimum load conditions as the piston head 668 moves towards one end of the cylinder 670, or vice versa, as the case may be.

Further in accordance with this embodiment of the invention, the cushion 18a includes a sleeve member 690 mounted in complementary concentric relation about cylinder 670 and formed with ports or orifices 692 that are to serve the same purpose as ports 84 of the movable tubular member 80 of cushion 18. Consequently, the orifices or ports 692 should have the relative spacing required that, when same are appropriately aligned with the respective orifices 680, will provide substantially constant force travel characteristics for a reasonable range of greater than minimum loads (when appropriately adjusted), up to the maximum contemplated for the car. In the case of both the orifices or openings 680 and 692, the formula and design procedure referred to in connection with cushion 18 may be followed to achieve the necessary sizing and spacing of these orifices though preferably the ports or orifices 692 have the tear shaped configuration described in connection with FIGURE 12.

The ports or orifices 680 and 692 communicate with annular chamber 693 that extends about sleeve 690 and between either end thereof.

The sleeve 690 is mounted for rotating movement with respect to and about the axis of cylinder 670, and fixed to one end of the sleeve 690 (see FIGURE 24) is a ring bevel gear 694 that meshes with a pinion bevel gear 696 journaled in any suitable manner in the housing 660, such as in bearing structure 698.

As indicated in FIGURE 23, the pinion bevel gear 696 may be fixed to a suitable shaft 700 to the outer end of which is keyed a suitable gear 702 that in accordance with the embodiment of FIGURE 21 is intended to mesh with the rack 98 of the weight sensing arrangement 95 described in connection with the embodiment of FIGURES 1-13, although obviously the gear 702 could be operably associated with the mechanical sensing arrangement of FIGURES 14-20 by making appropriate linkage connections, as so desired.

In the embodiment of FIGURE 21, the cushion 18a and the weight sensing arrangement 95 form a modified cushion adjusting arrangement 153b which provides substantially the same results as the previously described cushion adjusting arrangements. The weight sensing arrangement 95 functions in the manner previously described to adjust the sleeve 690 of cushion device 18a in accordance with the load actually on the car, it being assumed that the cylinder 670 and its adjusting sleeve 690 are positioned and proportioned with respect to each other (as above described) to give cushioning device 18a when adjusted by arrangement 95 (or by the embodiment of FIGURES 14-20) the optimum resistance for any load increment that may be encountered between the maximum and minimum weights to be carried by the car, which involves providing force travel closure characteristics of the preferred substantially constant force travel type. Of course, the sensing arrangement 95 must be appropriately indexed with respect to adjusting sleeve 690, when this embodiment of the invention is applied to the car, as previously described.

When an impact is occasioned, for instance in the direction of the arrow 704 of FIGURE 21, which would be against the left hand coupler in the showing of FIGURE 1A, the center sill structure 21 and the cushion housing 660 that is fixed with respect thereto move to the right under the impetus of impact to press the right hand operating rod flanged member 676 against the right hand abutment plate 650 of rack 14. The inertia of the rack 14 and its load results in relative movement between the housing 660 and piston head 668, whereby the housing 660 moves to the right of FIGURES 21 and 23 with respect to the piston head 668, causing a hydraulic liquid flow from the left hand side of piston head 668 through the aligned ports or orifices 680 and 692 and chamber 693 to the right hand side of piston head 668, and this movement proceeds until the cushion device reaches a fully contracted position comparable to that shown in FIGURE 7 in connection with the device 18 (in which piston head 668 is closely adjacent the left hand end of cylinder 670), after which the right hand compression spring 678 operates to return the cushion and rack 14 to recentered position. This return action in the embodiment of FIGURE 21 is aided by the booster spring 159 that is diagrammatically illustrated in FIGURE 1B.

When the direction of impact is in the opposite direction, the functioning of the hydraulic device is reversed, and draft forces are handled in a similar manner, though the operation of the cushion device will depend upon the direction of the draft force, as will be understood by those skilled in the art.

In the embodiment of FIGURE 22, the cushion device 18a forms a part of a manual cushion adjusting arrangement 153c. The cushion device 18a is essentially the same as that shown in FIGURE 21 and FIGURE 23 except that the shaft 700 is eliminated in favor of an elongate shaft 720, and the cushion device 18a is applied to the car with the shaft 720 extending downwardly and fixedly carrying a bevel gear 722 adapted for meshing engagement with a bevel gear 724 that is fixed to a shaft 726 journaled in any suitable manner in the car center sill structure 21, and preferably extending outwardly of one of the sill members 22 for association with a scale 730 that is applied to the side surface of the center sill and calibrated with respect to the correct positioning of the adjusting sleeve in terms of weight that might be carried on the car. Fixed to the outwardly extending end 732 is a handle 734 that cooperates with the scale 730, whereby the handle 734 may be turned to set the cushion 18a for the adjustment necessary to provide the desired constant force travel cushioning action for the load actually on the car. Railroad shippers or those who normally load cars would be capable of roughly estimating the load actually to be carried by a car equipped with a device 153c for a particular trip, and by moving the handle 734 to the corresponding weight graduation on scale 730, the cushion 18a of the embodiment of FIGURE 2 would automatically be set to provide the best cushioning action for that load.

In applying arrangement 153c to a car, the cushion 18a and handle 734 would be set for light loads, and then the links and gears coupling head 734 to adjusting sleeve 690a would be appropriately interconnected in operating relation.

FIGURE 25 illustrates the adjusting sleeve 690a (corresponding to sleeve 690) as used in connection with the cushion device of FIGURE 22, and this sleeve is modified in its porting as described in connection with the embodiment of FIGURES 26-29, and also by the use of a worm gear 719 in place of the ring gear 694, which is in meshing engagement with a suitable worm 721 fixed to the inner end of shaft 720. Shafts 720 and 726 may be journaled in their indicated positions in any suitable manner.

Still another manually adjustable cushion arrangement 153d is suggested by the showing of FIGURES 26-29, wherein the bevel gear 696 is shown fixed with respect to a stub shaft 740 provided with a screw driver receiving slot 742 in the outwardly extending end thereof. By applying the shaft 740 and its gear 696 to the cushion device 18a in place of the corresponding shaft 700 shown in FIGURE 23, and applying the resulting cushion device 18a to the cushion pocket 40 in such a manner that the stub shaft 740 projects upwardly or is otherwise available for adjustment purposes (see FIGURE 26), the arrangement indicated in FIGURE 21 is made a manually adjusting cushioning arrangement in which the weight sensing arrangement 95 can be eliminated.

Such an arrangement of the cushion device 18a is generally indicated at 750 in FIGURES 26–29. This embodiment of the invention includes a housing 660a that is generally similar to that of FIGURE 23 (and which is applied to the car and rack substantially in the same manner as indicated in FIGURE 21) the operating rod 666 to which piston head 668 is affixed, the hydraulic cylinder 670 and its orifices 680, and a sleeve member similar to sleeve member 690, which has been marked 690b as it differs somewhat from that shown in FIGURES 23 and 24.

In this embodiment of the invention, the orifices of adjustment sleeve 690b take the form of spaced rows 752, 754, 756 and 758 of round orifices 692a, 692b, 692c and 692d, which are arranged in parallel relation longitudinally of the sleeve as indicated at 26. The orifices 692a, 692b, 692c, and 692d in their respective rows are arranged lengthwise of the cushion device 750 in the same manner that ports 86 are arranged along the fixed tubular member 82 that forms a part of the metering pin 64 of cushion device 18.

However, the orifices of each row 752, 754, 756 and 758 are respectfully proportioned to provide substantially constant force travel cushioning characteristics for full load, three-quarter load, one-half load and one-quarter load conditions, substantially in the same manner as previously suggested in connection with the manually adjustable embodiment of cushion 18.

Furthermore, the ends 760 of the adjusting sleeve 690b is notched for each row of orifices, as at 762, to receive a ball 764 for providing an audible signal that the cushion device is properly set. The ball 764 is mounted in a chamber 766 that is formed in housing end wall 768 and is spring pressed outwardly of recess 766 and against sleeve end 760 by an appropriate compression spring 768.

A notch 762 is provided for and in alignment with each of the orifice rows 752, 754, 756 and 758, and the notches 762 are intended to be lined up with an indicating mark 770 applied to the top of the housing 660a (see FIGURE 29) adjacent a transparent viewing glass 772 appropriately affixed in the housing 660a for purposes of making visible the notches 762 as well as appropriate indicia 773 applied to the exterior surface of sleeve 690b adjacent each of said notches 762 to indicate the load setting desire. For instance, when the sleeve 690b is set, as by employing slot 742 of shaft 740 to turn same to the position of FIGURE 29, the cushion device 750 is adjusted to provide substantially constant force travel closure characteristics for three-quarter load conditions. This can readily be changed by appropriately turning shaft 740 until the desired load condition indicia appears visible through the glass 772, and the clicking of the ball 764 into the related notch 762 is heard by the operator.

In the specific form of cushion device 750 that is illustrated in FIGURES 26–29, the housing comprises end members 768 and 780 secured against the ends of the four sided shell 782 by appropriate bolts 784 or the like.

To avoid undue pressure build-ups within housing 660a, one of the sides 786 of shell 782 may be provided with a flexible panel 788, which in the form shown is fixed in place by an appropriate four sided bracket 790 and bolts or screws 792 for securing both of the latter to the housing 660a in seal tight manner. Thus, during operation of the cushion 750, the flexible panel 788, which may be formed from a hydraulic liquid resisting material of any suitable manner, such as the type described in connection with cushion 18, flexes outwardly of the housing 660a to relieve the pressure conditions. The resilience of the panel 788 (which should be comparable to natural rubber) is sufficient to restore all of the hydraulic liquid back within housing 660a after the high pressure liquid condition outside of the sleeves 670 and 690 has dissipated.

It may be pointed out that the flexible panel 788 of housing 660a may be protected in any suitable manner which will be obvious to those skilled in the art, and, of course, the housing 660a, would have to be mounted with respect to the car and rack to avoid interference with it.

In the general forms of the inevntion shown in FIGURES 21 and 23–29, the housing 660 (or 660a) could be fixed with respect to the rack 14, and abutment plates 650 fixed to the car underframe 12 to provide a further operative arrangement of cushion device 18a and its manual adjusting equivalents.

*Distinguishing characteristics of the invention*

It will therefore be seen that I have provided a hydraulic cushion arrangement for handling coupler impacts that is readily adjusted to provide the desired constant force-travel closure cushioning characteristic in cushioning the varying load weights that will be experienced by railroad cars in day to day service. The invention is particularly adapted for use with the cushion rack or platform structures above described because of the wide possible variations in load weights that may be carried by the car to which a particular cushion rack is applied.

Furthermore, the self-adjusting features of my adjustable cushioning arrangement are tied in directly with the operation of the railroad car truck springs, and since the springs accurately reflect the actual load carried by the car, these self-adjusting cushioning arrangements will be similarly accurate, particularly where the orifice area change rate concepts described in connection with the embodiment of FIGURE 12 are employed. The load sensing devices that are indexed with respect to the cushion 18 (or 18a) are unaffected by uneven distributions of weight on the car, as they collectively sense the total weight regardless of where it is concentrated. Moreover, these sensing arrangements automatically compensate for car sway or roll in transit, as the sensing devices involved at the raised and lowered portions of the car bed operate in complementarily opposite directions, reflecting no net change.

The cushion adjusting aspects of this invention are obviously applicable to a wide variety of car arrangements. It has already been pointed out that the illustrated cushion 18 and cushion sensing arrangement 95 may be applied to cars of the cushion underframe and cushion body car type, and this is also true of the other embodiments of the invention. Furthermore, the cushion device made adjustable in accordance with this invention may take the form of a hydraulic draft or car and buffer without departing from the principles of my invention.

The manual adjusting arrangement of FIGURE 22 obviously may be applied to cushion 18 by an appropriate substitution and rearrangement of parts that will be obvious to those skilled in the art.

Manual adjustment type arrangements of the type contemplated by this invention are particularly adapted for use in connection with cushion underframe and draft gear arrangements for standard cars where the previously suggested four standard dial settings (as for full, ¾, ½ and ¼ loads) would probably give adequate adjustment for load variations that would customarily be encountered, though obviously the same principle could readily be applied to container cars of the type illustrated.

For cases where fine adjustment is desired, the teardrop orifice configuration of FIGURE 12 and the orifice area change configuration concepts discussed in connection therewith are preferred for both cushions 18 and 18a.

It is also pointed out that the adjustment contemplated by this invention in connection with the specific cushion devices 18 and 18a that are illustrated may be effected by arranging for movement of the adjustable members longitudinally of the cushion as distinguished from the rotational movement that is disclosed. For instance, the tubular member 80 of metering pin 84 (of device 18) could be moved longitudinally of the cushion 18 to effect the adjustment desired by employing a suitable linkage and mounting member 80 for movement longitudinally of member 82. Similar remarks apply to cushion 18a and its equivalents.

In addition, the cushioning device 18 per se has a number of important aspects.

It will be noted that the seals provided by the clamps 198 and 200 and by the seals at the closure members 54 and 56 are of the static type. Thus, the need for accurately machined surfaces is eliminated. The sealing action between piston head 50 and the internal surface of the tubular cylinder 48 need only be sufficient to insure the cushion action required since a small amount of leakage has no significant adverse effects. Furthermore, the seal provided by clamps 198 and 200 and the tubular member they clamp in place is located at portions of the device that are not exposed to high pressures, while the seals exposed to high pressures are made by the rigid weld material, such as that at 272 and 293 of FIGURES 6 and 7. Since the welding material at these points, when properly done, is impervious to liquid, the effectiveness of such seals is obvious.

An important aspect of cushion 18 is that the sealing action about the piston head 50 is effected principally by the viscosity of the hydraulic liquid employed. The viscosity of the hydraulic liquid employed is sufficient to effect a sufficient sealing action around the piston head to be adequate for purposes of my invention without resorting to fine tolerances. If leakage about the piston head becomes excessive, this may be remedied by making the piston of greater dimension longitudinally of the cylinder 48, so as to increase the length of the flow path and resistance to leakage. When hydraulic liquid of the type above specified is to be employed, a piston head thickness of about 1½ inches is satisfactory for the specific embodiments referred to, but the actual piston thickness for any specific design will depend on such factors as the actual viscosity of the particular hydraulic liquid employed, the tolerances to be followed, and the pressure range that the device is to operate in.

In the illustrated device 18, piston ring 338 is employed to insure that the leakage area about piston head 50 has about the same relation to that between metering pin 64 and the piston head. This has been found necessary as larger size tubing has greater variations in internal diameter necessitating the correction provided by the piston ring.

While it is important that the viscosity of the hydraulic liquid employed remain substantially constant over a reasonable temperature range, the effect of viscosity changes in device 18 is minimized by the relatively short passages defined by the aligned ports forming metering pin orifices 157. The reason for this is that the effect of viscosity variations is a direct function of the length of the passage through which the hydraulic liquid flows, especially at the point of highest velocity which is at the orifice opening.

Successful tests made on cushion units of the general type shown in my said Patent 3,035,827 having the piston head fits described immediately above involved the use of a tube for cylinder 48 just as it was purchased from the manufacturer, with no machining of the inside surface 192, except for the formation of grooves 193. The cost savings obtained by avoiding the necessity for precision more than compensate for any small reductions in potential efficiency.

The oil leakage past piston head 50 because of tolerance variations actually serves an important function in my invention. If the piston head 50 continues to move on closure of orifices 157, the hydraulic liquid flow around piston head 50 prevents a sudden peaking of the cushioning force on the stroke end. The clearance tolerance which is provided between pin surface 329 and the piston head surface 328 also permits some oil flow at the stroke end, which contributes to the elimination of the force peaks at the end of the stroke.

Since the unit 18 is designed so that the maximum impact to be absorbed will have been absorbed when the last orifice 157 has closed, the piston head 50 will be spaced from closure 54 when the device is in its fully retracted position. This prevents the piston head from bottoming against closure plate 54 and the leakage about the piston head still permits the device to close further if need be, as limited by the length of metering pin surface portion 310. The length of the surface portion 310 in the above mentioned specific embodiments is approximately 1¼ inches, which was settled on to provide for a ¼ inch spacing of piston head 50 from closure 54 in the fully retracted position.

As the hydraulic liquid flows into chamber 205 on contraction of the device 18, and the tubular seal 190 extends under the relative movement of the piston rod and guide member therefor, the wall of the seal is ballooned outwardly. This tensioning of the seal, in addition to the outside atmospheric pressure on the seal, insures the return of the hydraulic liquid through the piston head 50 to the high pressure side of the piston on return of the unit to its extended position. The inflatability of the seal avoids any large build up of back pressure that would interfere with the operating characteristics of the device, and also compensates for temperature expansion and contraction of the volume of hydraulic liquid.

The external and internal surfaces of the tubular piston rod 52 need only be a standard rough finish (the finish normally obtained in commercial cold drawn tubing, such as found in Rockite tubing made by Joseph T. Ryerson & Son Inc., of Chicago, Illinois) since the guiding action provided by the guide member 196 does not require a highly polished surface and the metering pin does not contact the tubular piston rod. The internal surface of the cylinder 48 may be of like character since the viscosity of the hydraulic liquid is being relied on to effect the sealing action necessary between the cylinder 48 and piston head 50. This is to be distinguished from the machined surfaces customarily employed in devices of this type, which usually have tolerances on the order of six micro-inches.

The cooperation of the piston head surface 328 (that defines orifice 66) and the surface 329 defined by the metering pin 24 prevents vibration and chattering of the metering pin, and this not only protects the orifice 66 from deformation, but also protects the metering pin itself from denting and fatigue.

On contraction of the unit 18 in absorbing shock, the high pressure hydraulic flow is confined within the chamber 205 adjacent piston head 50 and the hydraulic liquid flow in the area of seal 190 is of relatively low velocity because the kinetic energy of the hydraulic liquid has been substantially dissipated in the liquid flow against the inner surface 192 of cylinder 48.

The action of the hydraulic liquid in flowing through orifice 66 and into turbulence chamber 205 dissipates in the form of heat substantially all of the kinetic energy imposed upon the device 18 that is not transferred by it, with the exception of the small amount of potential energy stored in springs 62. As the device 18 contracts under the shock, the discharge of hydraulic liquid from the orifice 204 engages successively different portions of the cylinder 12, thus accentuating the heat dissipation effect provided.

As has already been noted, the discharge from ports 204 is laterally of the piston rod, which is highly effective in creating a turbulence that will effectively convert the the kinetic energy of the hydraulic liquid into heat. This is done while permitting a low velocity hydraulic liquid flow along the length of the invaginating boot 190.

The unit 18 does not require check valves other than valve assembly 274 and need not necessarily be round in cross-sectional configuration, though from a manufacturing standpoint, this shape is preferred over polygonal cross sections. Unit 18 is in effect hermetically sealed against the entry of air or loss of hydraulic liquid.

The unit 18 may be employed wherever a long travel kinetic energy dissipating cushion action is desired; for instance, in addition to use in connection with a railroad car structure referred to above, the device may be employed to railroad car cushion fifth wheel stands.

While the unit 18 was designed to provide a cushioned traveling action on the order of thirty inches, the principles of the invention are just as applicable to short travel units.

Again, it is stressed that the simplified seals I have provided between the tubular cylinder 48 and the piston head and its piston rod 52 eliminate the need for precision formed parts. The cylinder 48, the piston head, and the tubular piston rod may be relatively loose fitting and yet provide all of the necessary cushioning action required. This eliminates the costly machining operations customarily required for devices of this type. Furthermore, the effective sealing action provided by the clamps 198 and 200 as well as the seal at the closure member 48 prevents any leakage, which eliminates the need for frequent inspections and servicing. Consequently, it will be seen that my invention provides an efficient cushion device of low initial cost and minimum maintenance requirements.

The term "mandrel-formed surface" as employed in the appended claims means surfaces on the order specified for surface 192 of tubular cylinder 48 and surfaces 190 and 203 of piston rod 52, which is to be distinguished from machined surfaces providing close tolerances.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A long travel hydraulic cushion device for absorbing railroad car coupler impacts, said device comprising:
   a cylinder having a closure means at one end,
   a piston having a head disposed in the cylinder to define first and second variable members and having a piston rod in the first chamber,
   said piston rod having a fluid passage,
   a metering pin means extending from the closure means and projecting into the second chamber and comprising a pair of concentric relatively movable first and second tubular members reciprocably extendible through the piston head into said passage and defining a bore communicating with said passage,
   each tubular member having port means for communicating with the other, the port means of one tubular member being spaced from the other in a plurality of positions in defining the force travel characteristics of the cushion device,
   means for varying the relative position of one tubular member with respect to the other,
   a flexible distensible hydraulic fluid-impervious member connecting with the piston rod and the cylinder for sealing the first chamber,
   the first chamber having a low pressure upon contraction of the cushion device and having orifice means for establishing communication between said first chamber and the flexible member, and said second chamber having a higher pressure upon contraction of the cushion means, and the port means of the tubular members providing fluid communication between the bore of the metering pin means and the second chamber,
   said piston rod having port means for providing fluid communication between the piston rod passage and the flexible member,
   and biasing means for extending the cushion unit to an expanded position.

2. The invention according to claim 1 and piston rod guide means in said first chamber for guidingly receiving said piston rod and said orifice means being disposed in said piston rod guide means for establishing communication between said first chamber and said flexible member.

3. A long travel hydraulic cushion device for absorbing railroad car coupler impacts, said device comprising:
   a tubular cylinder member,
   a closure member affixed to one end of said cylinder member,
   means for effecting a static hydraulic seal between said closure member and said one end of said cylinder member,
   a piston head reciprocably mounted in said cylinder member for movement toward and away from said one end of said cylinder member,
   a tubular piston rod affixed to said piston head,
   said piston rod extending away from said one end of said cylinder member,
   said piston rod being of less transverse dimension than said piston head,
   a closure member affixed to the end of said piston rod that is remote from said piston head,
   means for effecting a static seal between the last mentioned closure member and said end of said piston rod,
   a metering pin carried by the first mentioned closure member,
   said piston head being formed with an orifice to receive said metering pin,
   said orifice and said metering pin being aligned with the bore of said piston rod,
   a piston rod guide member secured to said cylinder member with said piston rod extending therethrough in guiding contact therewith,
   means for effecting a static seal between said cylinder member and said piston rod,
   the last mentioned means including a flexible and distendible hydraulic liquid impervious member having its ends fixed with respect to said cylinder member and piston rod, respectively, the arrangement being such that on contraction of said cushion device said first mentioned closure member, said cylinder member and said piston head define a high pressure chamber on one side of said piston head,
   and said piston rod guide member, said cylinder member, said piston rod and said piston head define a low pressure chamber on the other side of said piston head,
   said piston rod guide member being formed with orifice means for establishing communication between said low pressure chamber and said flexible member,
   said metering pin comprising a pair of relatively rotatable tubular members of complementary sizes and arranged in concentric relation,
   said tubular members of said metering pin each being formed with ports spaced apart longitudinally of said tubular members,
   said ports of said tubular members being spaced apart corresponding distances and defining the force travel characteristics of said cushion device, one of said tubular members of said metering pin being movable relative to the other, means for varying the relative position of said one tubular member of said metering pin with respect to the other, said piston rod being formed with orifice means directed transversely of said piston rod for connecting said piston rod bore with the space between said piston head and said piston rod guide member, with the space enclosed by said cylinder member, said closure members, said piston rod, and said static seals being filled with hydraulic liquid, and resilient means for biasing said piston head away from said one end of said cylinder member.

4. The cushion device set forth in claim 3 wherein said piston rod orifice means comprises a first orifice opening in said piston rod adjacent said piston head and communicating with said low pressure chamber, and a second orifice opening in said piston rod spaced from said piston head a distance on the order of the length of said metering pin.

5. The cushion device set forth in claim 3 wherein said flexible impervious member is formed from a material that consists essentially of natural rubber, and wherein said hydraulic liquid consists essentially of a butyl alcohol containing a synthetic lubricant.

References Cited by the Examiner

UNITED STATES PATENTS

| | | | |
|---|---|---|---|
| 1,242,103 | 10/1917 | Hunter | 188—88 |
| 1,273,011 | 7/1918 | Snyder | 188—88 |
| 2,003,823 | 6/1935 | Bucklen et al. | 188—87 |
| 2,628,692 | 2/1953 | Hufferd | 188—88 |
| 2,678,114 | 4/1954 | DeKoning et al. | 188—88 |
| 3,063,518 | 11/1962 | Stark | 188—88 |
| 3,163,300 | 12/1964 | Settles | 213—8 |

ARTHUR L. LA POINT, *Primary Examiner.*

DRAYTON E. HOFFMAN, EUGENE G. BOTZ,
*Examiners.*